United States Patent
Pogue

(10) Patent No.: US 10,666,417 B1
(45) Date of Patent: *May 26, 2020

(54) TIME SYNCHRONIZATION USING TIMESTAMP EXCHANGES

(71) Applicant: Amazon Technologies, Inc., Seattle, WA (US)

(72) Inventor: Michael Alan Pogue, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,209

(22) Filed: Oct. 5, 2018

Related U.S. Application Data

(63) Continuation of application No. 15/388,258, filed on Dec. 22, 2016, now Pat. No. 10,097,339.

(51) Int. Cl.
  *H04L 7/00* (2006.01)
  *H04W 56/00* (2009.01)

(52) U.S. Cl.
  CPC .......... *H04L 7/0054* (2013.01); *H04L 7/0037* (2013.01); *H04W 56/001* (2013.01)

(58) Field of Classification Search
  CPC ......... H04N 21/4307; H04N 21/43615; H04N 21/43637; H04N 21/8547; H04N 12/2807; G06F 3/162; G06F 3/165; G06F 17/3074; H04J 3/0632; H04J 3/0638; H04L 65/60; H04L 2012/2849; H04L 12/2807; G11B 27/10
  See application file for complete search history.

(56) References Cited

U.S. PATENT DOCUMENTS

| | | | |
|---|---|---|---|
| 2008/0031208 A1* | 2/2008 | Abhishek .......... | H04W 52/0225 370/338 |
| 2009/0172200 A1* | 7/2009 | Morrison ............. | G10H 1/0058 709/248 |
| 2012/0030173 A1* | 2/2012 | Freedman ............. | G06F 16/256 707/638 |

\* cited by examiner

*Primary Examiner* — Jung Liu
(74) *Attorney, Agent, or Firm* — Pierce Atwood LLP

(57) ABSTRACT

A system capable of synchronizing clocks on separate devices despite variable delays between the separate devices. The system may compensate for skew (e.g., difference between clocks) and drift (e.g., frequency offset between clocks). The system may determine the skew and drift based on differences between timestamps when packets are sent from a first device to a second device and vice versa. For example, the system may estimate a first line corresponding to the fastest packets from the first device to the second device and may estimate a second line corresponding to the fastest packets from the second device to the first device. The system may determine the skew based on a midpoint between the first line and the second line, and the drift based on a slope of the first line or the second line.

20 Claims, 23 Drawing Sheets

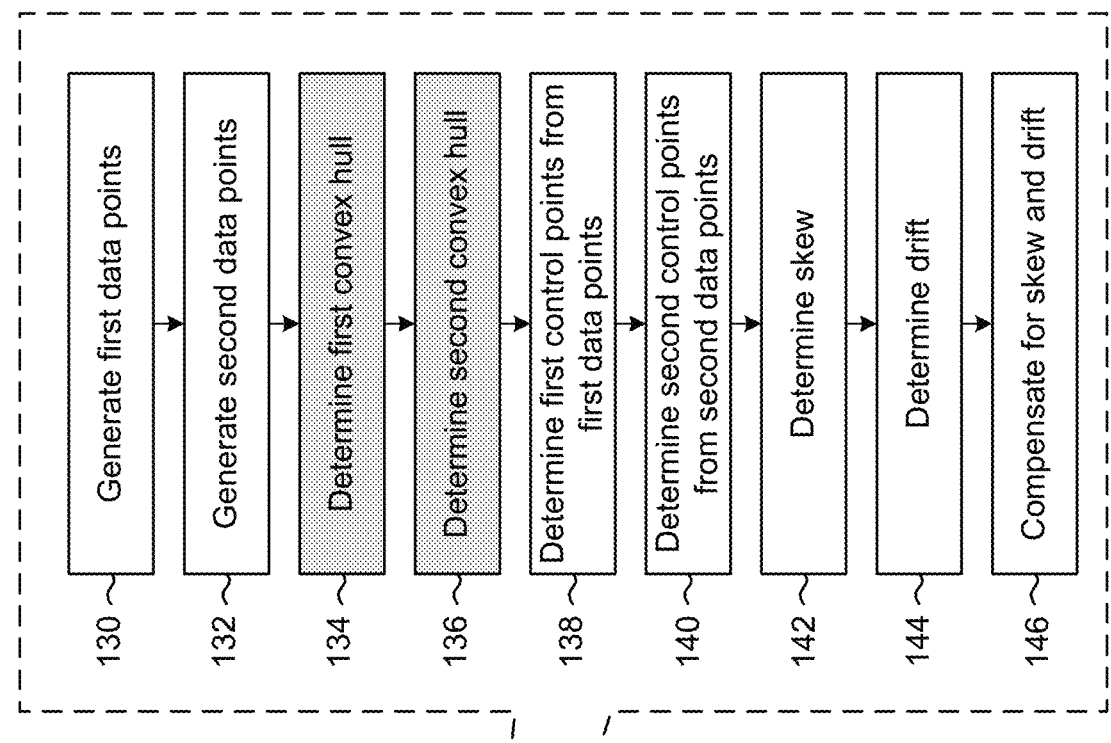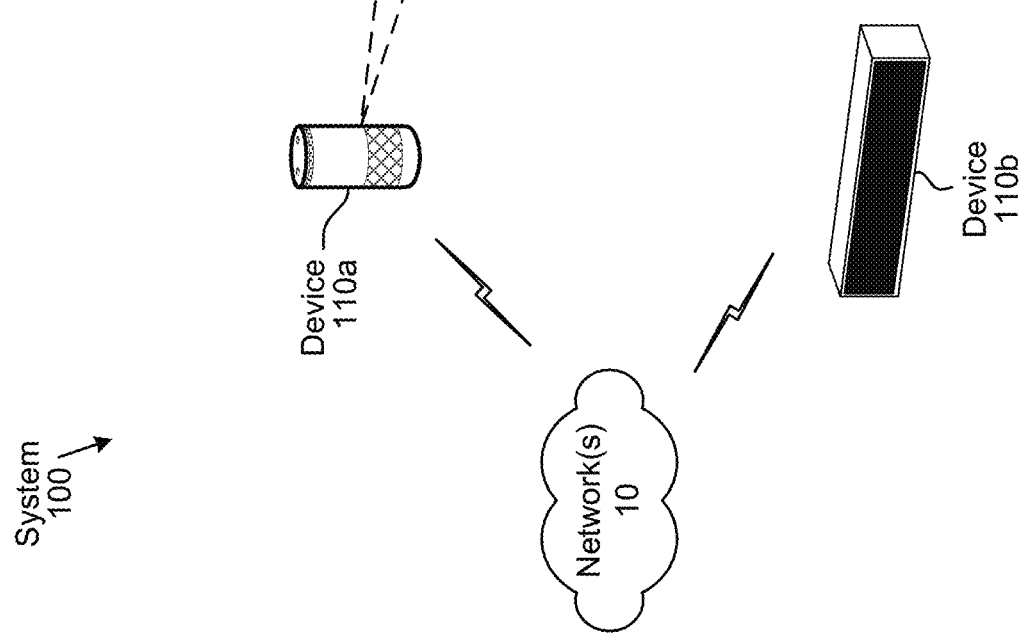

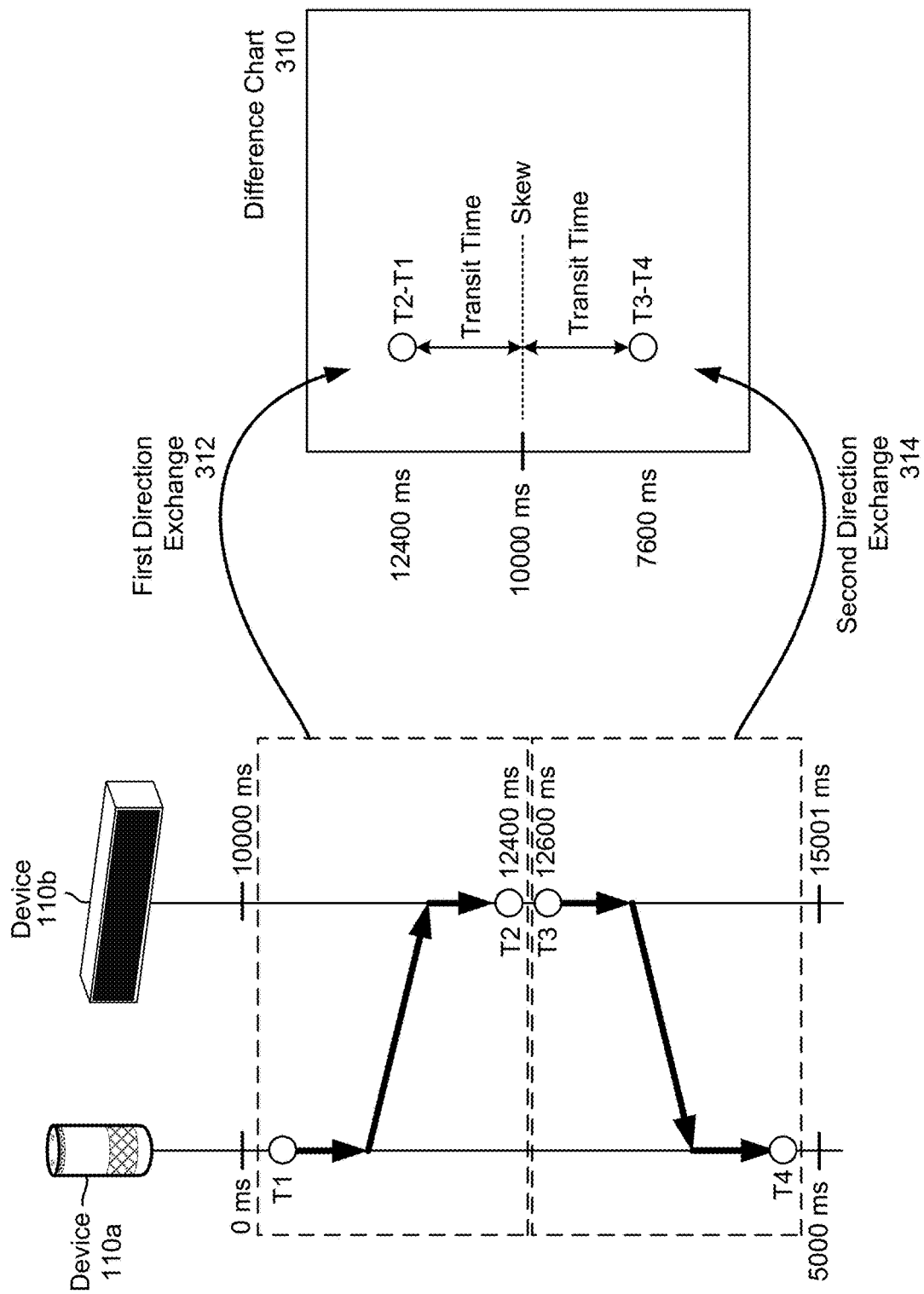

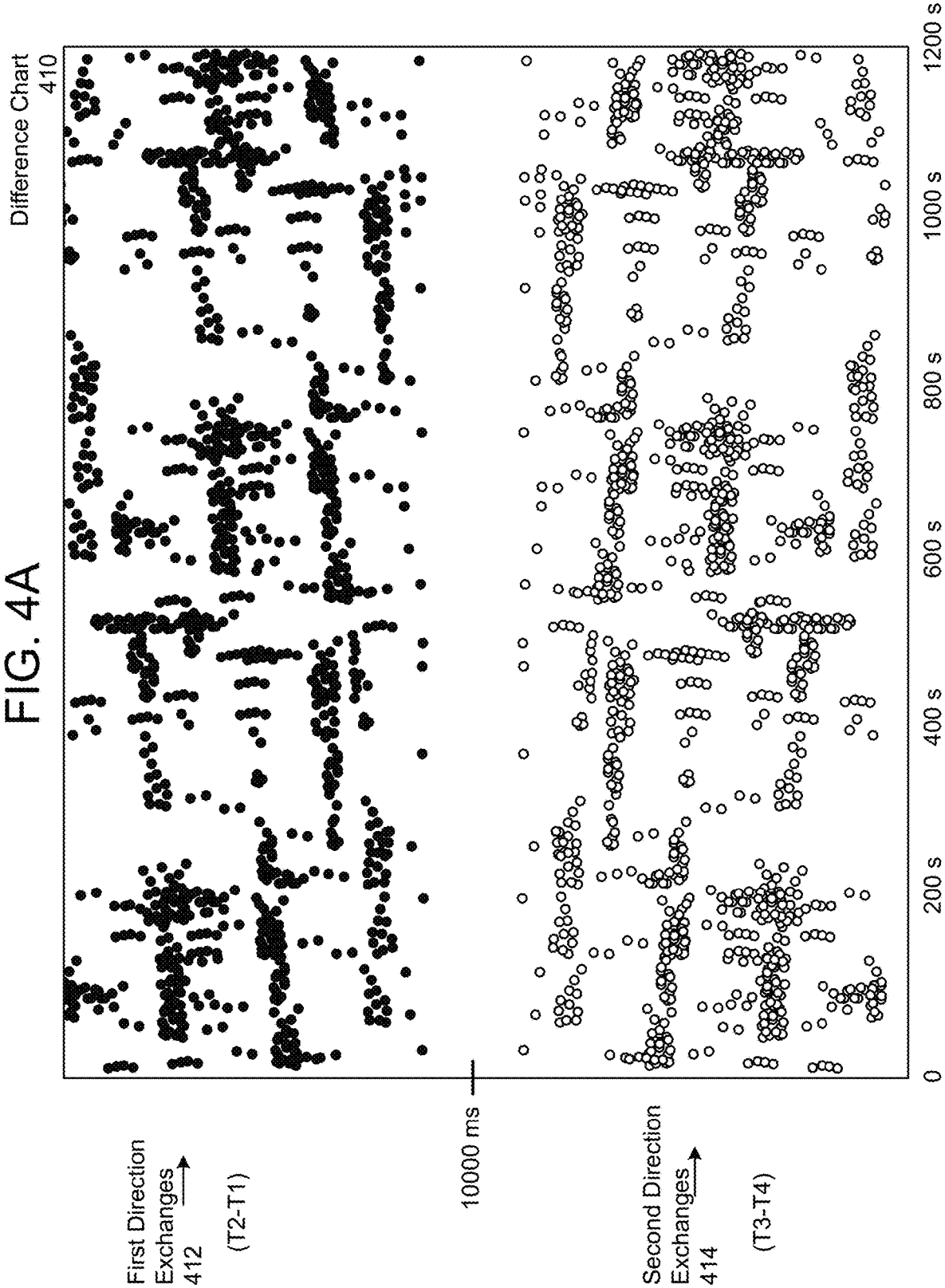

FIG. 5B
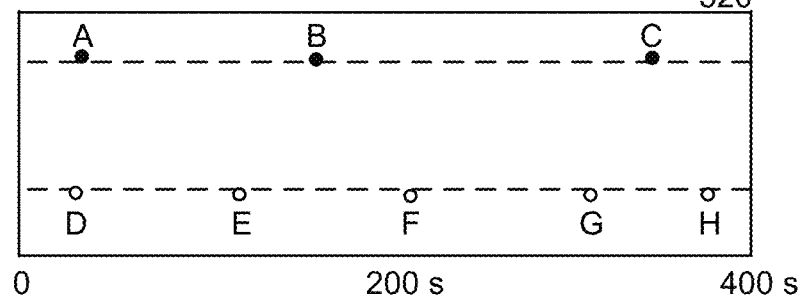
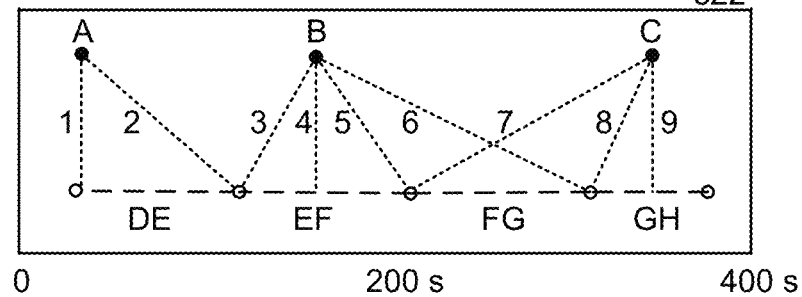
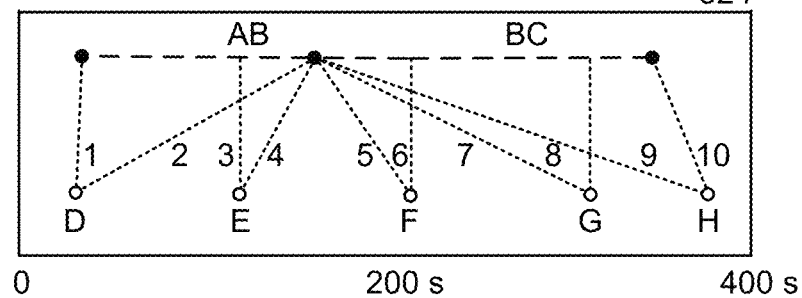
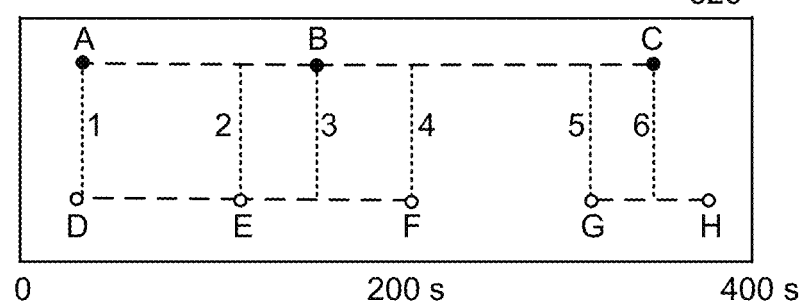

FIG. 5C
Difference Chart 530
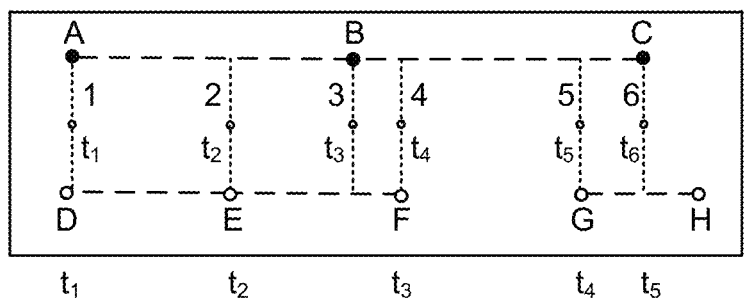
Difference Chart 532
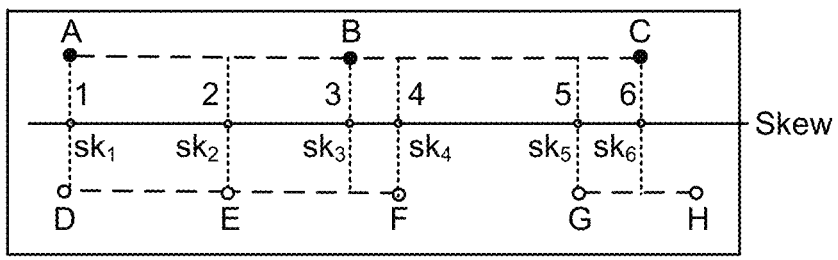
Difference Chart 534
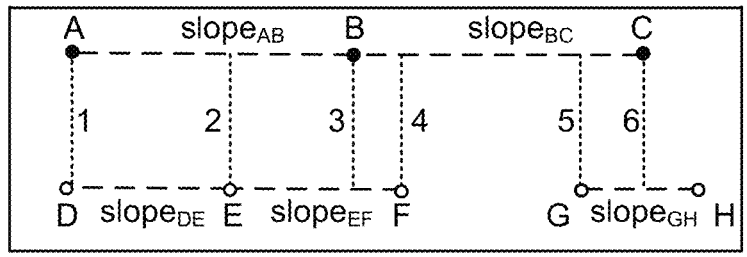
Synchronization Table 540
| # | Point | Line | Time | Skew | Drift |
|---|-------|------|------|------|-------|
| 1 | A | DE | $t_1$ | $sk_1$ | $slope_{DE}$ |
| 2 | E | AB | $t_2$ | $sk_2$ | $slope_{AB}$ |
| 3 | B | EF | $t_3$ | $sk_3$ | $slope_{EF}$ |
| 4 | F | BC | $t_4$ | $sk_4$ | $slope_{BC}$ |
| 5 | G | BC | $t_5$ | $sk_5$ | $slope_{BC}$ |
| 6 | C | GH | $t_6$ | $sk_6$ | $slope_{GH}$ |

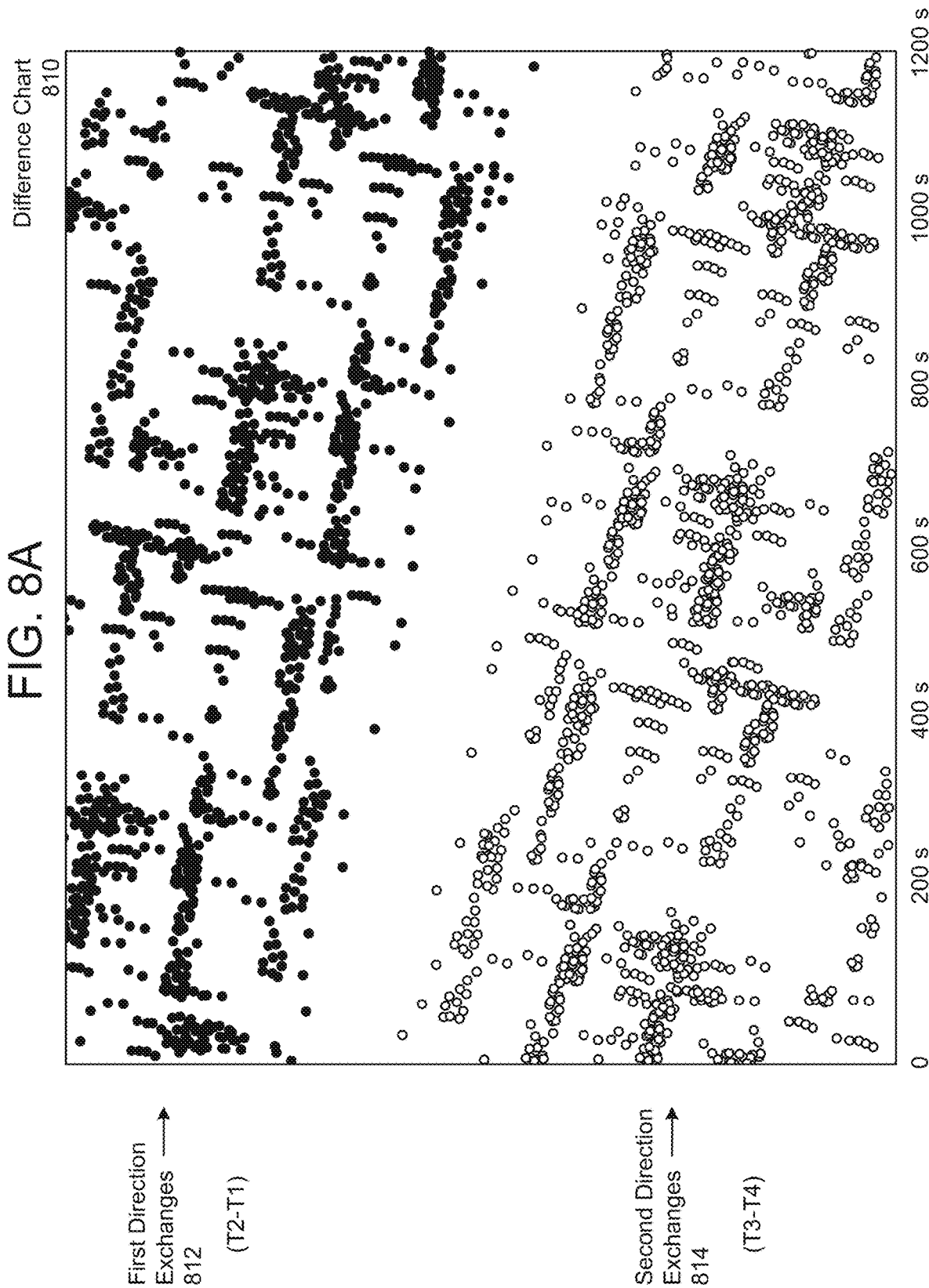

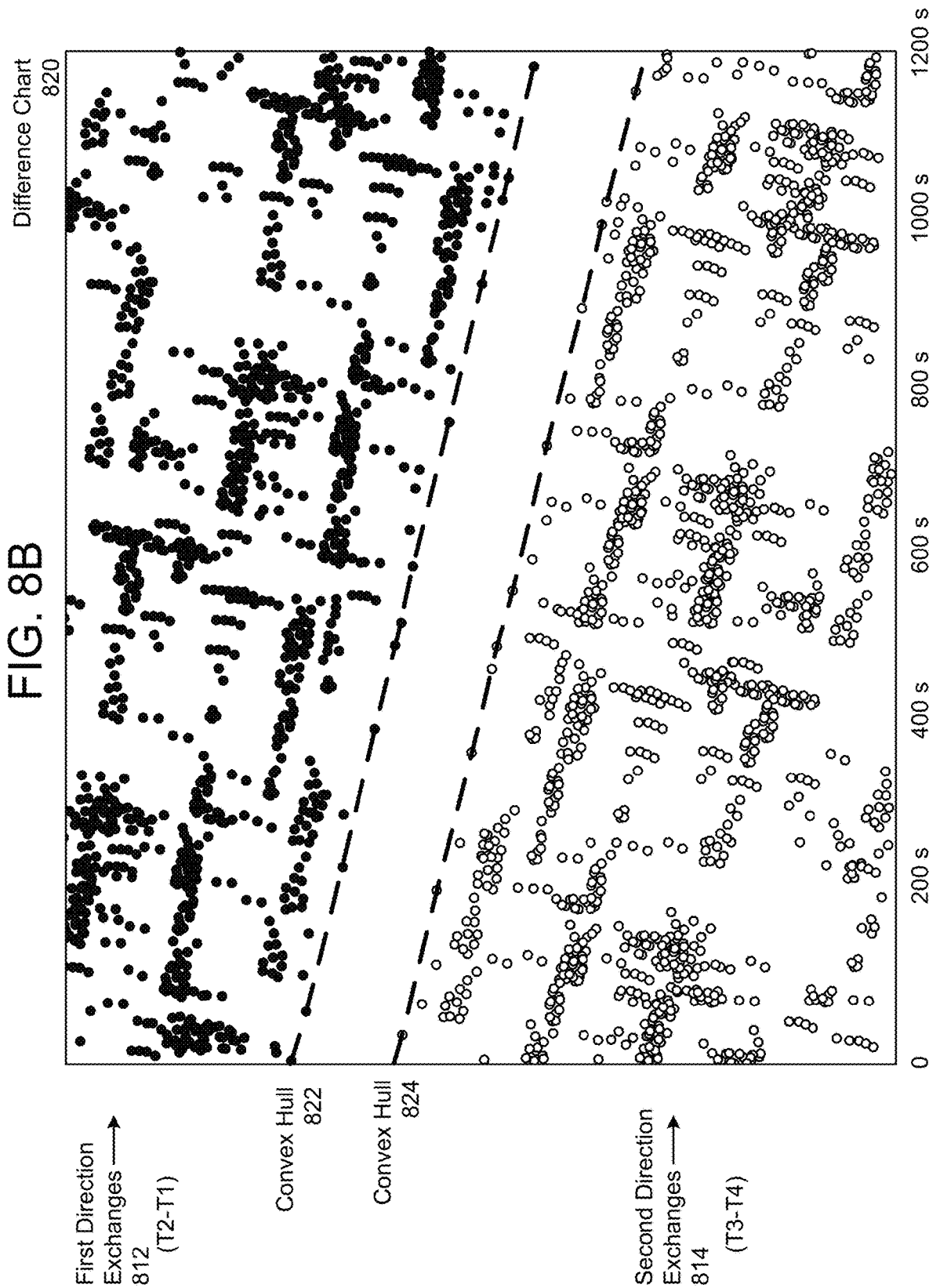

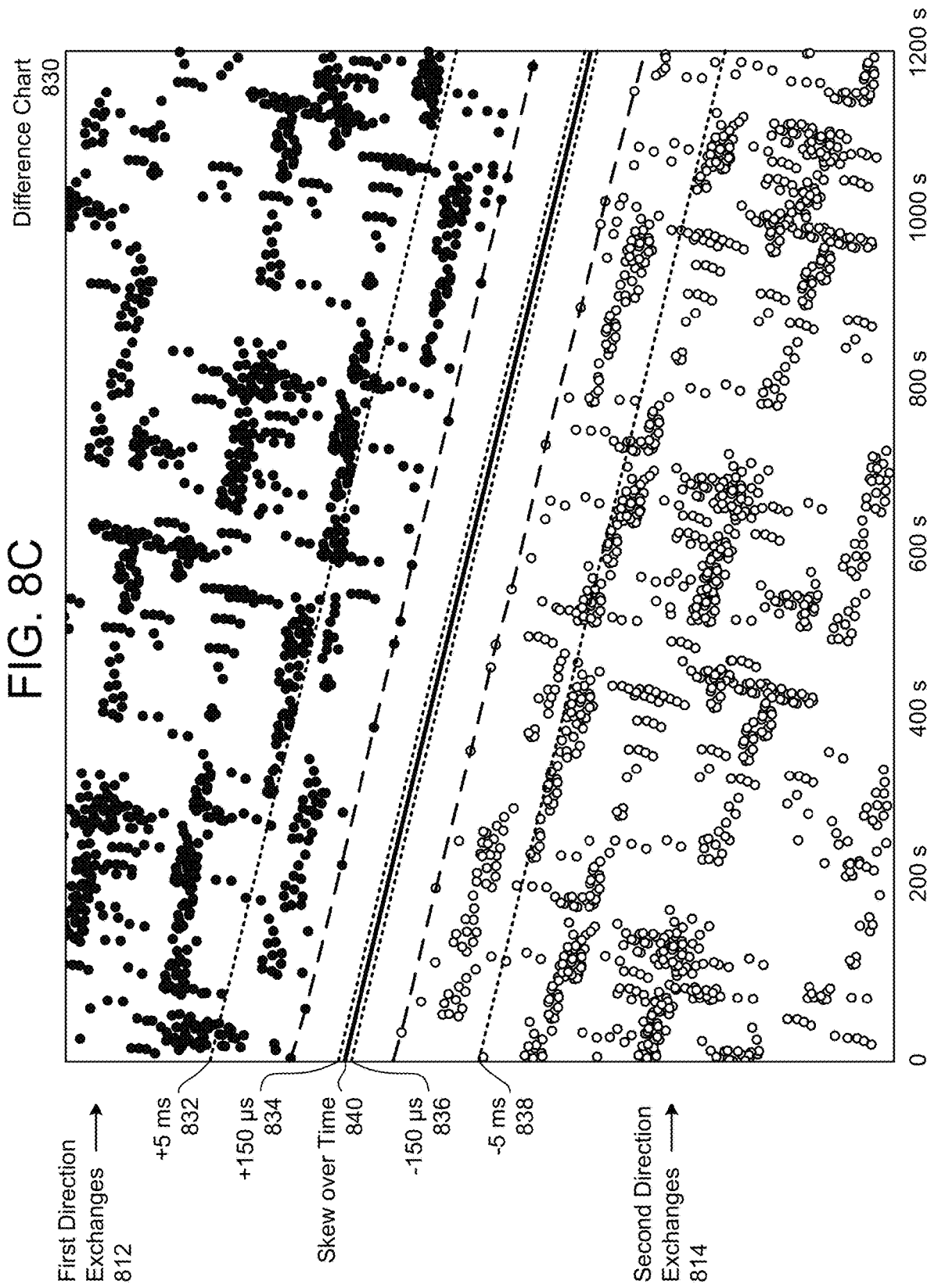

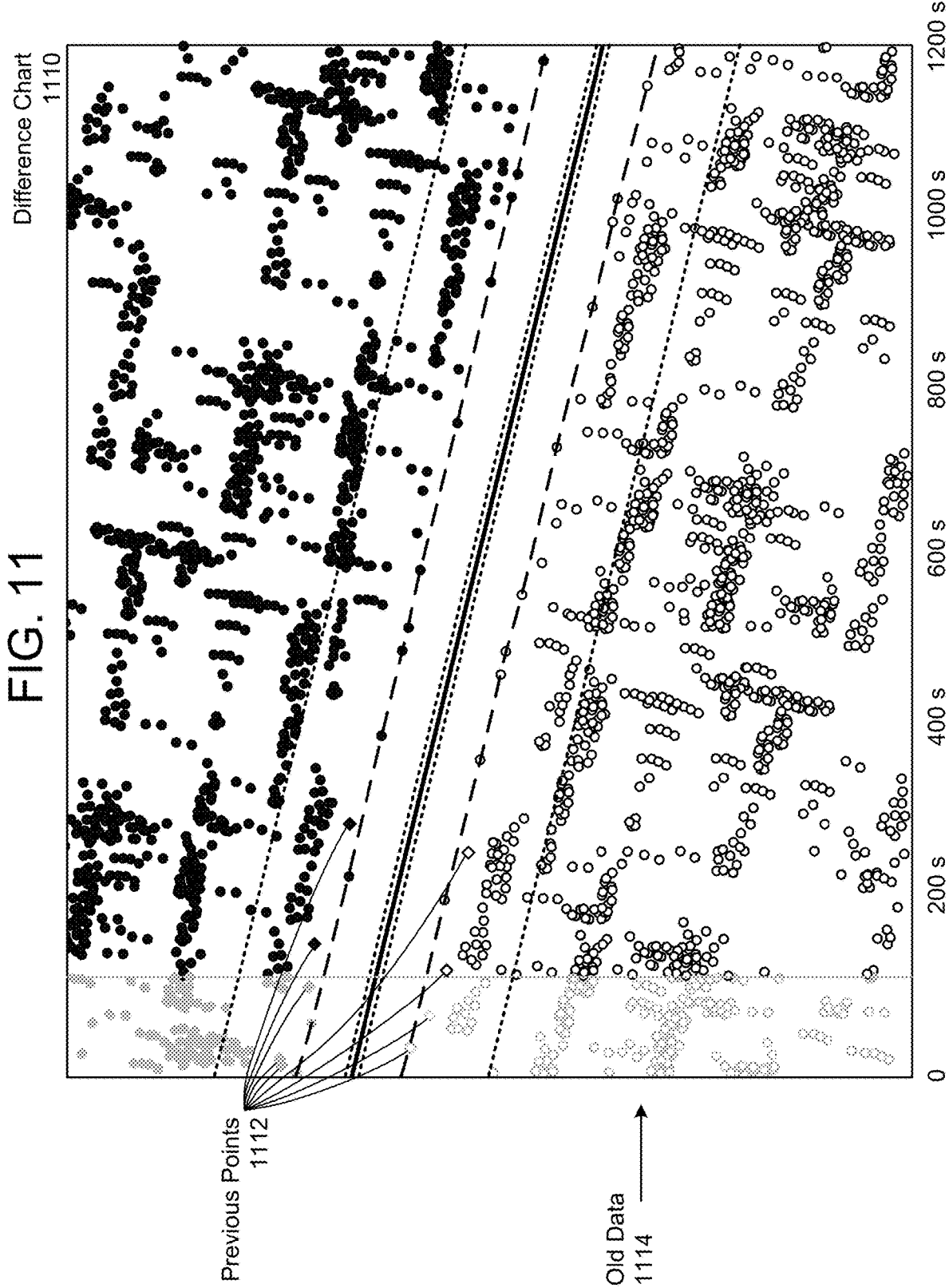

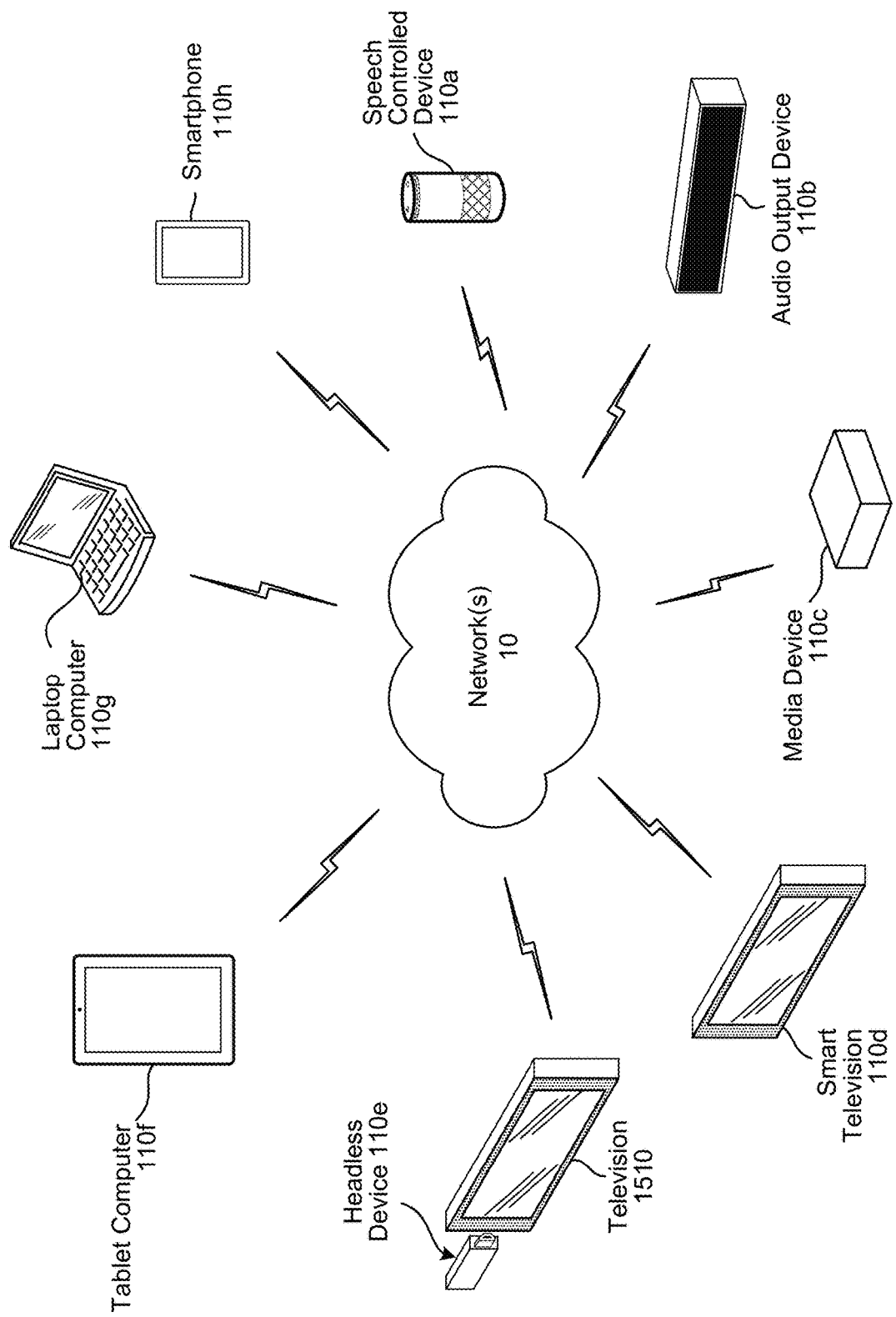

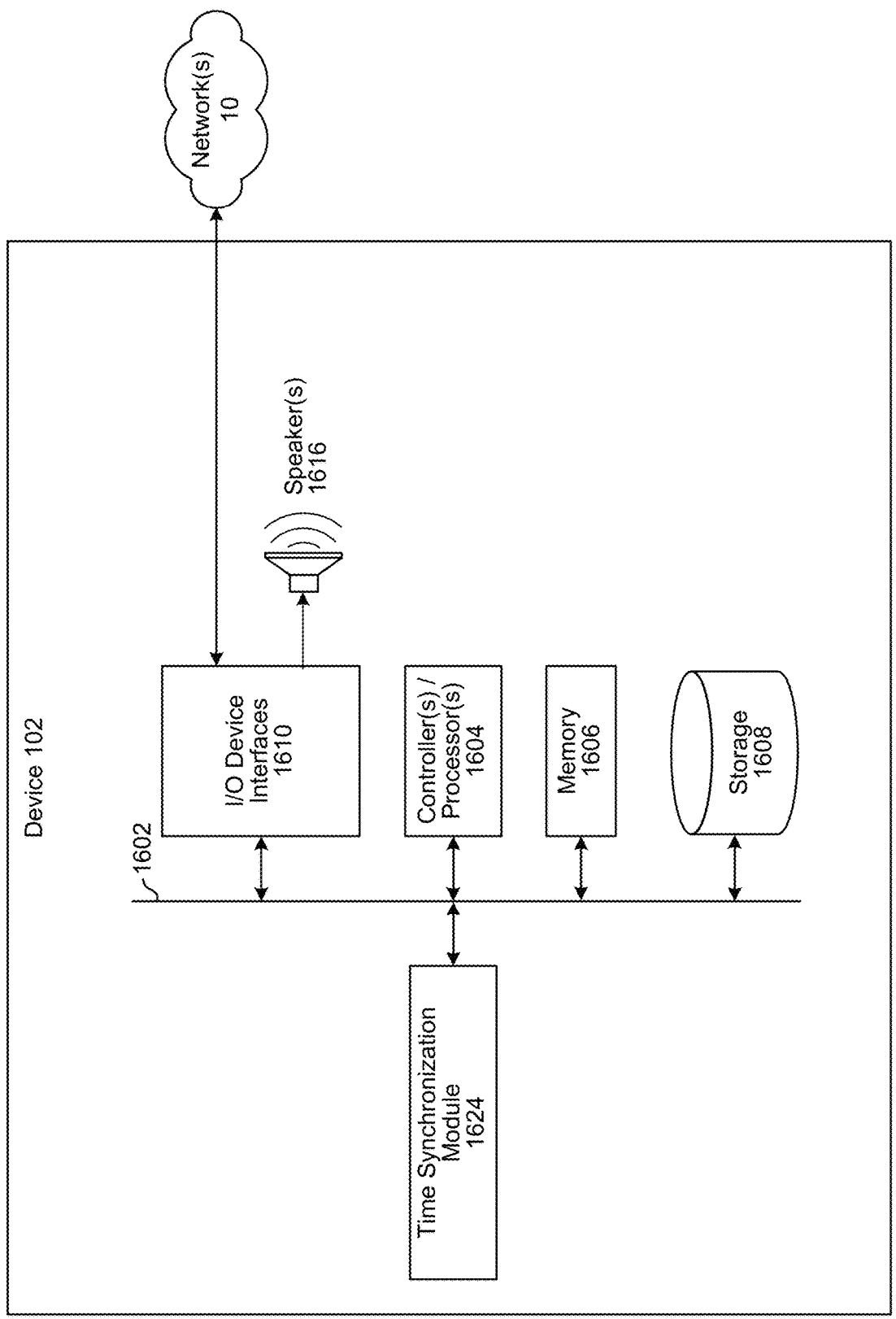

TIME SYNCHRONIZATION USING TIMESTAMP EXCHANGES

CROSS-REFERENCE TO RELATED APPLICATION DATA

This application is a continuation of, and claims priority to, U.S. patent application Ser. No. 15/388,258, entitled "TIME SYNCHRONIZATION USING TIMESTAMP EXCHANGES," filed on Dec. 22, 2016, in the name of Michael Alan Pogue, and scheduled to issue as U.S. Pat. No. 10,097,339 on Oct. 9, 2018. The above application is hereby incorporated by reference in its entirety.

BACKGROUND

With the advancement of technology, the use and popularity of electronic devices has increased considerably. Multiple electronic devices may be used to play audio at the same time. The devices may perform time synchronization so that clocks are synchronized and audio may be output at the correct time across multiple devices. Disclosed herein are technical solutions to improve time synchronization.

BRIEF DESCRIPTION OF DRAWINGS

For a more complete understanding of the present disclosure, reference is now made to the following description taken in conjunction with the accompanying drawings.

FIG. 1 illustrates a high-level conceptual block diagram of a system configured to perform audio placement according to embodiments of the present disclosure.

FIG. 3 illustrates an example of a timestamp exchange in ideal conditions according to embodiments of the present disclosure.

FIGS. 4A-4B illustrate examples of mapping timestamp exchanges and determining convex hulls according to embodiments of the present disclosure.

FIGS. 5A-5C illustrate examples of determining skew and drift using control points along convex hulls according to embodiments of the present disclosure.

FIGS. 8A-8C illustrate examples of determining skew and drift using convex hulls according to embodiments of the present disclosure.

FIG. 11 illustrates examples of expiring data points according to embodiments of the present disclosure.

FIG. 15 illustrates an example of a computer network for use with the system according to examples of the present disclosure.

FIG. 16 is a block diagram conceptually illustrating example components of a system 100 configured to perform audio placement according to embodiments of the present disclosure.

DETAILED DESCRIPTION

Figure 2A:
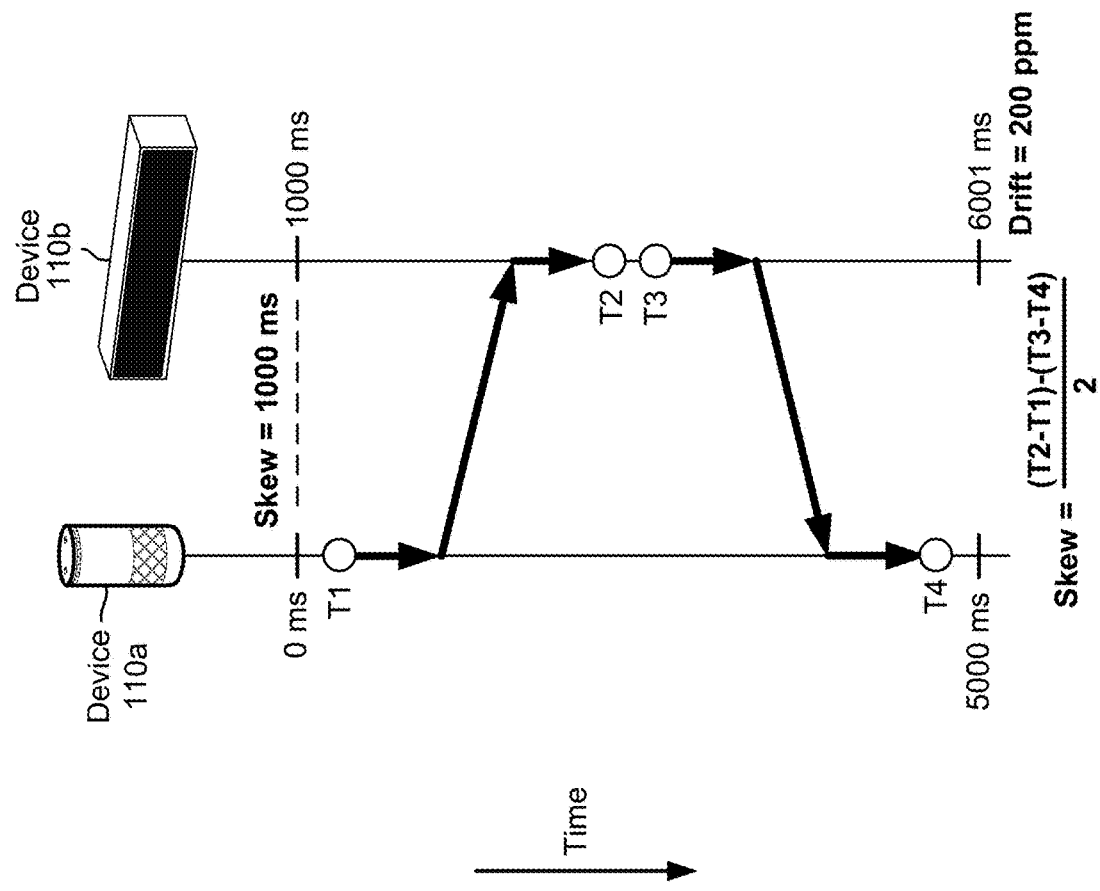
FIGS. 2A-2B illustrate examples of timestamp exchanges using precision time protocol.

Multiple electronic devices may be used to play audio at the same time. The devices may perform time synchronization so that clocks are synchronized and audio may be output at the correct time across multiple devices. For example, a first clock of a first device may be different from a second clock of a second device by a time offset (e.g., skew) and a frequency offset (e.g., drift). Thus, in order to synchronize the clocks, the devices must compensate for the skew and the drift.

A typical method for determining skew and drift is Precision Time Protocol (PTP), which performs timestamp exchanges when sending a first packet from the first device to the second device and when sending a second packet from the second device back to the first device. By assuming that the transit times are identical, the timestamp exchanges may be used to determine the skew and the drift between the clocks. However, variable delays result in variations in the transit times, rendering this technique unreliable and not always accurate. For example, variable delays inherent in a wireless local area network (WLAN) (such as WiFi) range from milliseconds to seconds based on buffers in the access point, preventing the PTP algorithm from converging due to jitter.

To improve time synchronization between separate devices, devices, systems and methods are disclosed that may separate timestamp exchanges, select timestamp exchanges corresponding to fixed delays and determine skew and drift based on the selected timestamp exchanges. Thus, instead of using combined timestamp exchanges at a specific time to determine the skew and/or drift, the system may determine the skew and/or drift based on an aggregate of multiple timestamp exchanges (e.g., over a period of time) in order to account for the variable delays. For example, the system may identify first control points corresponding to fastest packets sent from the first device to the second device (e.g., using a first convex hull enveloping first timestamp exchanges) and identify second control points corresponding to fastest packets from the second device to the first device (e.g., using a second convex hull enveloping second timestamp exchanges). The system may determine the skew and the drift based on the first control points and the second control points. For example, the system may determine the skew based on a midpoint between the first convex hull and the second convex hull and may determine the drift based on a slope of a midline between the first convex hull and the second convex hull that corresponds to the midpoint. For example, the system may select first points along the first convex hull and second points along the second convex hull and may compare the first points to the second points to determine the skew and drift.

Additionally or alternatively, the system may detect changes in network parameters and may recalculate the skew and drift based on additional data points. In some examples, a device may include multiple time synchronizers and may associate each time synchronizer with a separate connection. For example, when switching from a first connection to a second connection, the device may switch from a first time synchronizer to a second time synchronizer and may determine the skew and drift using the second time synchronizer.

FIG. 1 illustrates a high-level conceptual block diagram of a system configured to perform time synchronization according to embodiments of the present disclosure. As illustrated in FIG. 1, the system 100 may include a first device 110a connected to a second device 110b over network(s) 10. While FIG. 1 illustrates the first device 110a as a speech enabled device and the second device 110b as an audio output device (e.g., wireless speaker), the disclosure is not limited thereto and the device 110 may be any electronic device capable of time synchronization. Similarly, while FIG. 1 illustrates the network(s) 10 as a wireless network, the disclosure is not limited thereto and the network(s) 10 may be any network that includes variable delays.

Time synchronization between devices enables the devices to share a common notion of time. For example, a first clock included in the first device 110a may be different than a second clock included in the second device 110b, with a potential skew (e.g., time offset) and drift (e.g., frequency offset) between the clocks. In order to share a common notion of time, the first device 110a and/or the second device 110b need to determine the skew and drift between them and compensate for the skew and drift. Thus, the devices 110 may convert the common notion of time to a local clock and add or subtract samples (e.g., clock ticks, time values, etc.) to synchronize. For example, the first device 110a may compensate for the skew by adding or subtracting a time value corresponding to the skew. Similarly, the first device 110a may compensate for the drift by adding or subtracting to the skew estimate over time. For example, a drift of 200 parts per million (ppm) corresponds to an additional 1 ms delay every 5000 ms. Thus, the skew may start at a first value (e.g., 2000 ms) and may increase every 5000 ms to a second value (e.g., 2001 ms).

By having a common notion of time, the devices may translate timestamps from the first clock to the second clock, enabling sophisticated synchronization between the devices 110. For example, the devices 110 may generate audio output at the same time, enabling multi-room audio or left-right stereo audio between devices 110 connected via wireless networks.

When multiple devices 110 are connected to each other, they may select one device as a master clock and the remaining devices may synchronize with the master clock. For example, if four devices 110 are synchronized, the devices 110 may select Device A as the master clock and may synchronize between Device A and Device B, between Device A and Device C, and between Device A and Device D. This reduces an amount of clock mismatch compared to synchronizing Device A to Device B, Device B to Device C and Device C to Device D.

In some examples, the devices 110 may select the master clock having the highest accuracy, which corresponds to the smallest potential drift. For example, a first clock may have an accuracy within +/−20 ppm, whereas a second clock may have an accuracy +/−2 ppm. To increase the accuracy of the clocks within the system, the second clock may be selected as the master clock as it has the highest accuracy and therefore drift between the clocks will be caught more quickly.

As illustrated in FIG. 1, the first device 110a may generate (130) first data points corresponding to a first timestamp exchange (e.g., in a first direction) and may generate (132) second data points corresponding to a second timestamp exchange (e.g., in a second direction). For example, the first timestamp exchange may correspond to packets sent from the first device 110a to the second device 110b, with the first data points corresponding to a difference between a first timestamp taken by the first device 110a and a second timestamp taken by the second device 110b. Similarly, the second timestamp exchange may correspond to packets sent from the second device 110b to the first device 110a, with the second data points corresponding to a difference between a third timestamp taken by the second device 110b and a fourth timestamp taken by the first device 110a. Due to variable delays in the network(s) 10, the first data points and the second data points may vary drastically, with some data points corresponding to a short transit time and other data points corresponding to a long transit time. If the skew is positive, the first data points will be higher than the second data points, whereas if the skew is negative, the first data points will be lower than the second data points.

The first device 110a may optionally determine (134) a first convex hull based on the first data points and may optionally determine (136) a second convex hull based on the second data points. For example, the first convex hull may enclose the first data points, such that the first convex hull is the smallest convex set that contains the first data points, which may be visualized as the shape enclosed by a rubber band stretched around the first data points. Similarly, the second convex hull may enclose the second data points, such that the second convex hull is the smallest convex set that contains the second data points, which may be visualized as the shape enclosed by a rubber band stretched around the second data points. The first convex hull and the second convex hull may be parallel, with a gap in the middle caused by the transit times between the first device 110a and the second device 110b.

The first device 110a may determine (138) first control points from the first data points, the first control points corresponding to the shortest transit times from the first device 110a to the second device 110b (e.g., local extrema, whether maxima or minima). For example, the first control points may include a portion of the first data points along the first convex hull. The first device 110a may determine (140) second control points from the second data points, the second control points corresponding to the shortest transit times from the second device 110b to the first device 110a (e.g., local extrema, whether maxima or minima). For example, the second control points may include a portion of the second data points along the second convex hull. The control points correspond to the short transit times that therefore approximate ideal transit times that do not include a variable delay. As the control points correspond to the short transit times, they are along the gap between the first data points and the second data points and may be used to determine the skew between the first clock and the second clock and a corresponding drift.

In some examples, the first control points may correspond to minima (e.g., a portion of the first data points having a local minimum value), such that the first convex hull corresponds to a bottom edge of the first data points, and the second control points may correspond to maxima (e.g., a portion of the second data points having a local maximum value), such that the second convex hull corresponds to a top edge of the second data points. However, the disclosure is not limited thereto and in other examples, the first control points may correspond to maxima (e.g., a portion of the first data points having a maximum value), such that the first convex hull corresponds to a top edge of the first data points, and the second control points may correspond to minima (e.g., a portion of the second data points having a minimum value), such that the second convex hull corresponds to a bottom edge of the second data points. Thus, the control points may correspond to extrema and the first convex hull and the second convex hull may be approximately parallel and separated by a gap that corresponds to the transit times.

In some examples, the system 100 may determine the control points by determining the convex hulls. One of the benefits of determining the convex hulls is that the convex hulls efficiently identify data points along the gap between the first data points and the second data points, as the convex hull algorithm takes into account data points over a relatively long period of time. In addition, as data points "expire" (e.g., the first device 110a removes and/or ignores data points older than a fixed duration, such as an hour), the convex hulls maintain an edge corresponding to the expired data point. For example, if the first convex hull extends from a first data point to a second data point and the first data point expires, the first convex hull may approximate the first data point along a vector between the first data point and the second data point. Thus, as time progresses, the approximated data point moves along the vector until the second data point expires, taking into account the first data point despite the first data point expiring. This enables the estimated skew and/or estimated drift to converge to a stable value faster than other techniques.

While the examples illustrated in FIG. 1 and the following drawings describe the system 100 determining the control points by determining the convex hulls, the disclosure is not limited thereto and the system 100 may determine the control points that correspond to the shortest transit times (e.g., local maxima or minima) using other techniques known to one of skill in the art without departing from the disclosure. For example, the first device 110a may determine the control points using a moving minima filter (and/or maxima filter), such as by selecting the minimum/maximum values of the first data points and the second data points for a fixed window of time (e.g., one second, ten seconds, etc.). While the moving minima/maxima filters may identify the control points (e.g., local extrema), the moving minima/maxima filters may provide coarser granularity than the convex hulls as the minima/maxima filters discard data points outside of the fixed window of time.

Regardless of how the system 100 determines the control points, the key aspect is that the system 100 identifies the control points corresponding to shortest transit times using an aggregate of timestamp exchanges over a period of time instead of a combined timestamp exchange at a specific point in time. Thus, the system 100 is not limited to a single technique and may determine the control points using one or more techniques without departing from the disclosure. For ease of explanation, the following description will continue to refer to determining the control points by determining convex hulls, as the convex hulls effectively illustrate that the control points correspond to the extrema (e.g., maxima and minima of the data points). However, the disclosure is not limited thereto and determining the convex hulls may be broadly considered a filtering process used to identify a portion of the data points as the control points.

The first device 110a may determine (142) skew between the first clock and the second clock and may determine (144) drift between the first clock and the second clock. Assuming that the shortest transit time from the first device 110a to the second device 110b is identical to the shortest transit time from the second device 110b to the first device 110a, the first device 110a may estimate the skew by determining midpoint(s) between the first control points and the second control points (e.g., a midpoint between a control point along the first convex hull and a point along the second convex hull, or vice versa). For example, as will be described in greater detail below with regard to FIGS. 5A-5C, the first device 110a may determine vectors between the portion of the first data points along the first convex hull and the portion of the second data points along the second convex hull. The first device 110a may determine vector lengths corresponding to the vectors and may select the shortest vector length. The first device 110a may estimate the skew based on a midpoint of the selected vector and may estimate the drift based on a slope between the portion of the first data points and/or the portion of the second data points in proximity to the vector.

After determining the skew and the drift, the first device 110a may compensate (146) for the skew and the drift. For example, the first device 110a may synchronize the first clock to the second clock such that they share a common notion of time. In addition, if the second clock drifts relative to the first clock, the first device 110a may add samples to the first clock to compensate for the drift.

Figure 2B:
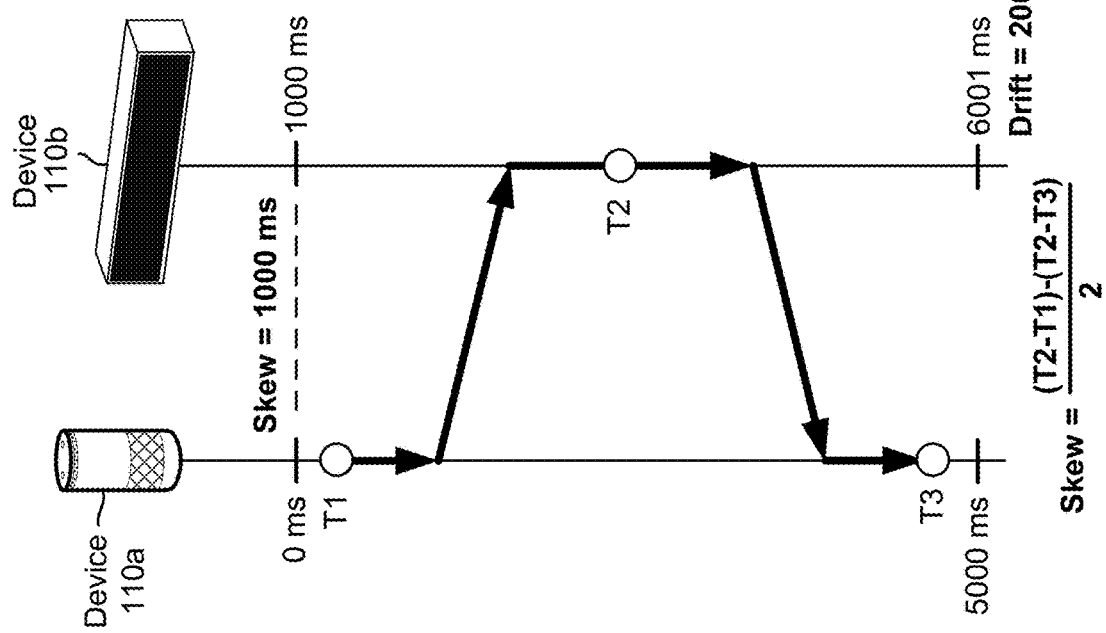

FIGS. 2A-2B illustrate examples of timestamp exchanges using a precision time protocol (PTP). PTP algorithms may use timestamp exchanges to synchronize multiple clocks over a network. For example, PTP algorithms exchange timestamps between two devices and determine skew (e.g., time offset between clock times) and drift (e.g., frequency offset between the clocks) between the devices based on the timestamp exchange.

As illustrated in FIG. 2A, a first clock associated with the first device 110a may have a skew of 1000 ms and a drift of 200 part per million (ppm) relative to a second clock associated with the second device 110b. Thus, at a first time (e.g., 0 ms), the first clock may correspond to a first value (e.g., 0 ms) whereas the second clock may correspond to a second value (e.g., 1000 ms). In addition to the time offset between the first clock and the second clock, a first frequency of the first clock may differ from a second frequency of the second clock by a small amount, such that the second clock may increase at a slightly faster rate. For example, the drift of 200 ppm means that every 5000 ms, the second click will drift by 1 ms relative to the first clock.

The first device 110a may generate a first timestamp T1 at a first time and may send a first data packet including the first timestamp T1 to the second device 110b. The second device 110b may receive the first data packet, generate a second timestamp T2 at a second time and may send a second data packet including the first timestamp T1 and/or the second timestamp T2 to the first device 110a. The first device 110a may receive the second data packet, generate a third timestamp T3 at a third time and compare the timestamps (e.g., T1, T2 and T3) to determine the drift and the skew. For example, the first time may correspond to a first clock time (e.g., 0 ms) for the first device 110a and a second clock time (e.g., 1000 ms) for the second device 110b. Similarly, the second time may correspond to a third clock time (e.g., 2500 ms) for the first device 110a and a fourth clock time (e.g., 3500 ms) for the second device 110b, and the third time may correspond to a fifth clock time (e.g., 5000 ms) for the first device 110a and a sixth clock time (e.g., 6001 ms) for the second device 110b. Thus, the first timestamp T1 has a value of 0 ms, the second timestamp T2 has a value of 3500 ms and the third timestamp T3 has a value of 5000 ms.

To determine the skew, the PTP algorithm may treat the exchange of timestamps as a single exchange and assume that a first transit time from the first device 110a to the second device 110b is identical to a second transit time from the second device 110b to the first device 110a. As the first direction exchange (e.g., T2−T1) includes the first transit time and a positive skew and the second direction exchange (e.g., T3−T2) includes the second transit time and a negative skew, the positive skew cancels the negative skew and an average of the two exchanges corresponds to the average transit time. Therefore, the first device 110a may determine the average transit time using an equation such as Transit$_{AVG}$=($\frac{1}{2}$)((T2−T1)+(T3−T2)), which in this case is equal to Transit$_{AVG}$=($\frac{1}{2}$)((3500−0)+(5000−3500))=2500 ms.

To determine the skew, the first device 110a may determine the differences between the timestamps relative to a fixed clock (e.g., either the first clock or the second clock). Using this technique, the first direction exchange (e.g., T2−T1) includes a positive skew and a positive first transit time while the second direction exchange (e.g., T2−T3) includes a positive skew and a negative second transit time, such that the first transit time cancels the negative second transit time and an average of the two exchanges corresponds to the skew. Therefore, the first device 110a may determine the skew using an equation such as Skew=($\frac{1}{2}$)((T2−T1)−(T2−T3)), which in this case is equal to Skew=($\frac{1}{2}$)((3500−0)+(3500−5000))=1000 ms.

As illustrated in FIG. 2A, the third time corresponds to the fifth clock time (e.g., 5000 ms) for the first device 110a and the sixth clock time (e.g., 6001 ms) for the second device 110b, which corresponds to a drift of 200 ppm. Using the timestamps, the first device 110a may determine the drift between the first clock and the second clock. To illustrate an example, the fourth clock time may actually be 3500.5 ms and the first device 110a may determine the drift after compensating for the skew and the transit time. For example, the first device 110a may determine that at the second time, the first clock would be equal to T2$_A$=T1+Transit$_{AVG}$=0+2500=2500 ms, while the second clock would be equal to T2$_B$=T2−Skew=3500.5−1000=2500.5 ms. Therefore, the drift would be equal to (T2$_B$−T2$_A$)/T2$_A$=(2500.5−2500)/2500=200 ppm. Thus, the first device 110a may determine that the second clock is 200 ppm faster than the first clock.

In some examples, the second device 110b may generate two separate timestamps when receiving the first data packet and when sending the second data packet. For example, FIG. 2B illustrates the second device 110b generating one timestamp after receiving the first data packet from the first device 110a and generating another timestamp prior to sending the second packet to the first device 110a. Thus, the first device 110a may generate a first timestamp T1 at a first time and may send a first data packet including the first timestamp T1 to the second device 110b. The second device 110b may receive the first data packet and may generate a second timestamp T2 at a second time. The second device 110b may generate a third timestamp T3 at a third time and may send a second data packet including the first timestamp T1, the second timestamp T2 and/or the third timestamp T3 to the first device 110a. The first device 110a may receive the second data packet and generate a fourth timestamp T4 at a fourth time.

The first device 110a may compare the timestamps (e.g., T1, T2, T3 and T4) to determine the drift and the skew. For example, the first time may correspond to a first clock time (e.g., 0 ms) for the first device 110a and a second clock time (e.g., 1000 ms) for the second device 110b. Similarly, the second time may correspond to a third clock time (e.g., 2400 ms) for the first device 110a and a fourth clock time (e.g., 3400 ms) for the second device 110b, the third time may correspond to a fifth clock time (e.g., 2600 ms) for the first device 110a and a sixth clock time (e.g., 3600 ms) for the second device 110b and the fourth time may correspond to a seventh clock time (e.g., 5000 ms) for the first device 110a and an eighth clock time (e.g., 6001 ms) for the second device 110b. Thus, the first timestamp T1 has a value of 0 ms, the second timestamp T2 has a value of 3400 ms, the third timestamp T3 has a value of 3600 ms and the fourth timestamp T4 has a value of 5000 ms.

As discussed above, the PTP algorithm may treat the exchange of timestamps as a single exchange and assume that a first transit time from the first device 110a to the second device 110b is identical to a second transit time from the second device 110b to the first device 110a. As the first direction exchange (e.g., T2−T1) includes the first transit time and a positive skew and the second direction exchange (e.g., T4−T3) includes the second transit time and a negative skew, the positive skew cancels the negative skew and an average of the two exchanges corresponds to the average transit time. Therefore, the first device 110a may determine the average transit time using an equation such as Transit$_{AVG}$=($\frac{1}{2}$)((T2−T1)+(T4−T3)), which in this case is equal to Transit$_{AVG}$=($\frac{1}{2}$)((3400−0)+(5000−3600))=2400 ms.

To determine the skew, the first device 110a may determine the differences between the timestamps relative to a fixed clock (e.g., either the first clock or the second clock). Using this technique, the first direction exchange (e.g., T2-T1) includes a positive skew and a positive first transit time while the second direction exchange (e.g., T3-T4) includes a positive skew and a negative second transit time, such that the first transit time cancels the negative second transit time and an average of the two exchanges corresponds to the skew. Therefore, the first device 110a may determine the skew using an equation such as Skew=($\frac{1}{2}$)((T2−T1)−(T3−T4)), which in this case is equal to Skew=($\frac{1}{2}$)((3400−0)+(3600−5000))=1000 ms.

As illustrated in FIG. 2B, the fourth time corresponds to the seventh clock time (e.g., 5000 ms) for the first device 110a and the eighth clock time (e.g., 6001 ms) for the second device 110b, which corresponds to a drift of 200 ppm. Using the timestamps, the first device 110a may determine the drift between the first clock and the second clock. To illustrate an example, the fourth clock time may actually be 3400.48 ms and the sixth clock time may be 3600.52 ms and the first device 110a may determine the drift after compensating for the skew and the transit time. For example, the first device 110a may determine that at the second time, the first clock would be equal to T2$_A$=T1+Transit$_{AVG}$=0+2400=2400 ms, while the second clock would be equal to T2$_B$=T2−Skew=3400.48−1000=2400.48 ms. Therefore, the drift would be equal to (T2$_B$−T2$_A$)/T2$_A$=(2400.48−2400)/2400=200 ppm. Similarly, the first device 110a may determine that at the third time, the first clock would be equal to T3$_A$=T4−Transit$_{AVG}$=5000−2400=2600 ms, while the second clock would be equal to T3$_B$=T3−Skew=3600.52−1000=2600.52 ms. Therefore, the drift would be equal to (T3$_B$−T3$_A$)/T3$_A$=(2600.52−2600)/2600=200 ppm. Thus, the first device 110a may determine that the second clock is 200 ppm faster than the first clock.

When variable delays are present within the network(s) 10, however, the assumption that the first transit time is equal to the second transit time is invalid. For example, a wireless local area network (WLAN) (such as WiFi) has variable delays caused by buffers included in each network device (e.g., first device 110a, access point, range extender and/or second device 110b), resulting in the first packet being delayed a first amount of time and the second packet being delayed a second amount of time. Thus, variable delays prevent consistency between exchanges (e.g., the first transit time is different from a third transit time and the second transit time is different from a fourth transit time) in addition to causing asymmetry within a single exchange (e.g., the first transit time is different from the second transit time). Under these conditions, the PTP algorithm does not converge and cannot reliably determine the skew and/or drift.

To determine the skew and/or drift when variable delays are present, the first device 110a may separate the timestamp exchange into sending timestamp exchanges (e.g., in a first direction) and receiving timestamp exchanges (e.g., from a second direction). The first device 110a may analyze the sending timestamp exchanges to determine first minimum transit times from the first device 110a to the second device 110b and may analyze the receiving timestamp exchanges to determine second minimum transit times from the second device 110b to the first device 110a. Based on the first minimum transit times and the second minimum transit times, the first device 110a may determine the skew and the drift. For example, the first device 110a may assume that the minimum transit times are consistent over time in the aggregate (e.g., over a large number of timestamp exchanges) and that local minimum transit times may vary but will not be lower than a global minimum transit time (e.g., functional minimum) that may be determined based on the aggregate timestamp exchanges.

FIG. 3 illustrates an example of a timestamp exchange in ideal conditions according to embodiments of the present disclosure. As illustrated in FIG. 3, a first clock associated with the first device 110a may have a skew of 10000 ms and a drift of 200 part per million (ppm) relative to a second clock associated with the second device 110b. Thus, at a first time (e.g., 0 ms), the first clock may correspond to a first value (e.g., 0 ms) whereas the second clock may correspond to a second value (e.g., 10000 ms). In addition to the time offset between the first clock and the second clock, a first frequency of the first clock may differ from a second frequency of the second clock by a small amount, such that the second clock may increase at a slightly faster rate. For example, the drift of 200 ppm means that every 5000 ms, the second click will drift by 1 ms relative to the first clock.

The first device 110a may generate a first timestamp T1 at a first time and may send a first data packet including the first timestamp T1 to the second device 110b. The second device 110b may receive the first data packet and may generate a second timestamp T2 at a second time. The second device 110b may generate a third timestamp T3 at a third time and may send a second data packet including the first timestamp T1, the second timestamp T2 and/or the third timestamp T3 to the first device 110a. The first device 110a may receive the second data packet and generate a fourth timestamp T4 at a fourth time.

The first device 110a may compare the timestamps (e.g., T1, T2, T3 and T4) to determine the drift and the skew. For example, the first time may correspond to a first clock time (e.g., 0 ms) for the first device 110a and a second clock time (e.g., 10000 ms) for the second device 110b. Similarly, the second time may correspond to a third clock time (e.g., 2400 ms) for the first device 110a and a fourth clock time (e.g., 12400 ms) for the second device 110b, the third time may correspond to a fifth clock time (e.g., 2600 ms) for the first device 110a and a sixth clock time (e.g., 12600 ms) for the second device 110b and the fourth time may correspond to a seventh clock time (e.g., 5000 ms) for the first device 110a and an eighth clock time (e.g., 15001 ms) for the second device 110b. Thus, the first timestamp T1 has a value of 0 ms, the second timestamp T2 has a value of 12400 ms, the third timestamp T3 has a value of 12600 ms and the fourth timestamp T4 has a value of 5000 ms.

The first device 110a may separate these timestamps into a first direction exchange 312 (e.g., sending timestamp exchange) and a second timestamp exchange 314 (e.g., receiving timestamp exchange) and may plot them in a difference chart 310. As the first direction exchange 312 (e.g., T2−T1) includes a positive skew and a positive first transit time while the second direction exchange 314 (e.g., T3−T4) includes a positive skew and a negative second transit time, the first direction exchange 312 and the second direction exchange 314 will be centered around the skew (e.g., 10000 ms). For example, the difference chart 310 illustrates the first direction exchange 312 having a value of 12400 ms (e.g., skew+transit time) while the second direction exchange 314 has a value of 7600 ms (e.g., skew−transit time). Note that FIG. 3 illustrates an ideal example where the first transit time is equal to the second transit time in order to establish the framework for determining the skew and/or drift, as will be described in greater detail below. Under normal conditions, the transit times will vary drastically based on variable delays within the network(s) 10.

Figure 4B:
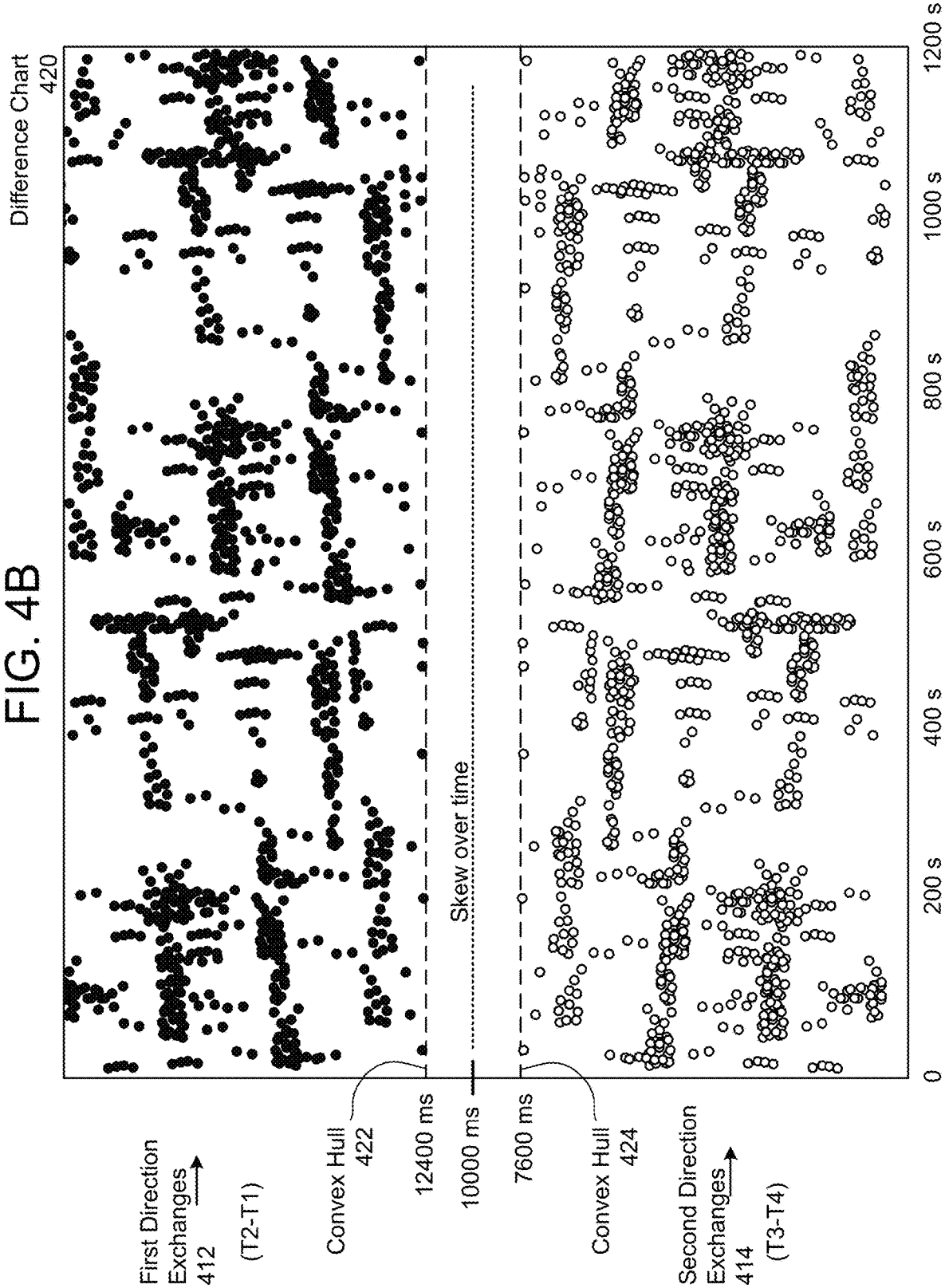

FIGS. 4A-4B illustrate examples of mapping timestamp exchanges and determining convex hulls according to embodiments of the present disclosure. FIG. 4A illustrates a difference chart 410 that plots first direction exchanges 412, which correspond to packets sent from the first device 110a to the second device 110b (e.g., T2−T1), and second direction exchanges 414, which correspond to packets sent from the second device 110b to the first device 110a (e.g., T3−T4). As illustrated in FIG. 4A, the first direction exchanges 412 and the second direction exchanges 414 are randomly distributed, although there may be a distinct pattern caused by the variable buffers included in the network(s) 10.

As illustrated in FIG. 4A, the first direction exchanges 412 are larger than the second direction exchanges 414 because of the positive transit time caused by subtracting the first timestamp T1 from the second timestamp T2, whereas the second direction exchanges 414 are smaller than the first direction exchanges 412 because of the negative transit time caused by subtracting the fourth timestamp T4 from the third timestamp T3. However, this is intended as an illustrative example and the disclosure is not limited thereto. Instead, the first direction exchanges 412 may be smaller than the second direction exchanges 414 without departing from the disclosure.

As illustrated in FIG. 4A, the first direction exchanges 412 are separated from the second direction exchanges 414 by a gap corresponding to the transit times. The gap may be centered around the skew between the first clock of the first device 110a and the second clock of the second device 110b. To illustrate a simple example, the difference chart 410 illustrated in FIG. 4A does not include a drift between the first clock and the second clock, so the skew remains relatively stable.

To determine the skew, the first device 110a may select a portion of the first direction exchanges 412 and the second direction exchanges 414 as control points. For example, the first device 110a may select first control points from the first direction exchanges 412 that have the smallest values (e.g., minima just above the gap), which correspond to fastest transit times from the first device 110a to the second device 110b, and may select second control points from the second direction exchanges 414 that have the largest values (e.g., maxima just below the gap), which correspond to the fastest transit times from the second device 110b to the first device 110a.

In some examples, in order to select the control points the first device 110a may determine a first convex hull 422 that encloses the first direction exchanges 412 and a second convex hull 424 that encloses the second direction exchanges 414. The first convex hull 422 of the first direction exchanges 412 is the smallest convex set that contains the first direction exchanges 412, which may be visualized as the shape enclosed by a rubber band stretched around the first direction exchanges 412. Similarly, the second convex hull 424 of the second direction exchanges 414 is the smallest convex set that contains the second direction exchanges 414, which may be visualized as the shape enclosed by a rubber band stretched around the second direction exchanges 414. However, the disclosure is not limited thereto and the first convex hull 422 may correspond to any filtering process that identifies the first control points (e.g., local minima) included in the first direction exchanges 412 and the second convex hull 424 may correspond to any filtering process that identifies the second control points (e.g., local maxima) included in the second direction exchanges 414 without departing from the disclosure.

The first control points may be along the first convex hull 422 and the second control points may be along the second convex hull 424. As illustrated in FIG. 4B, the first convex hull 422 and the second convex hull 424 are adjacent to the gap between the first direction exchanges 412 and the second direction exchanges 414. Thus, the first device 110a may use the first control points and the second control points to determine that the skew between the first clock and the second clock is equal to 10000 ms, as discussed below with regard to FIGS. 5A-5C.

While FIGS. 4A-4B illustrate the skew being relatively stable (e.g., 10000 ms for a duration of time), this is intended for illustrative purposes only and the disclosure is not limited thereto. Instead, the skew may vary based on the drift and the first device 110a may estimate the skew value over time, such that the first device 110a may estimate a specific skew value (e.g., point along the y axis) corresponding to a specific time (e.g., point along the x axis). Thus, the skew does not correspond to a single value over time (e.g., corresponding to a horizontal line) but instead varies over time (e.g., corresponding to a line with a non-zero slope). For ease of explanation, the following description may refer to determining a skew value (e.g., point along the y axis) without specifying that the skew value corresponds to a specific time (e.g., point along the x axis). However, the first device 110a may only use the estimated skew value for a duration of time (e.g., around the specific time) before the estimated skew value is inaccurate.

Figure 5A:
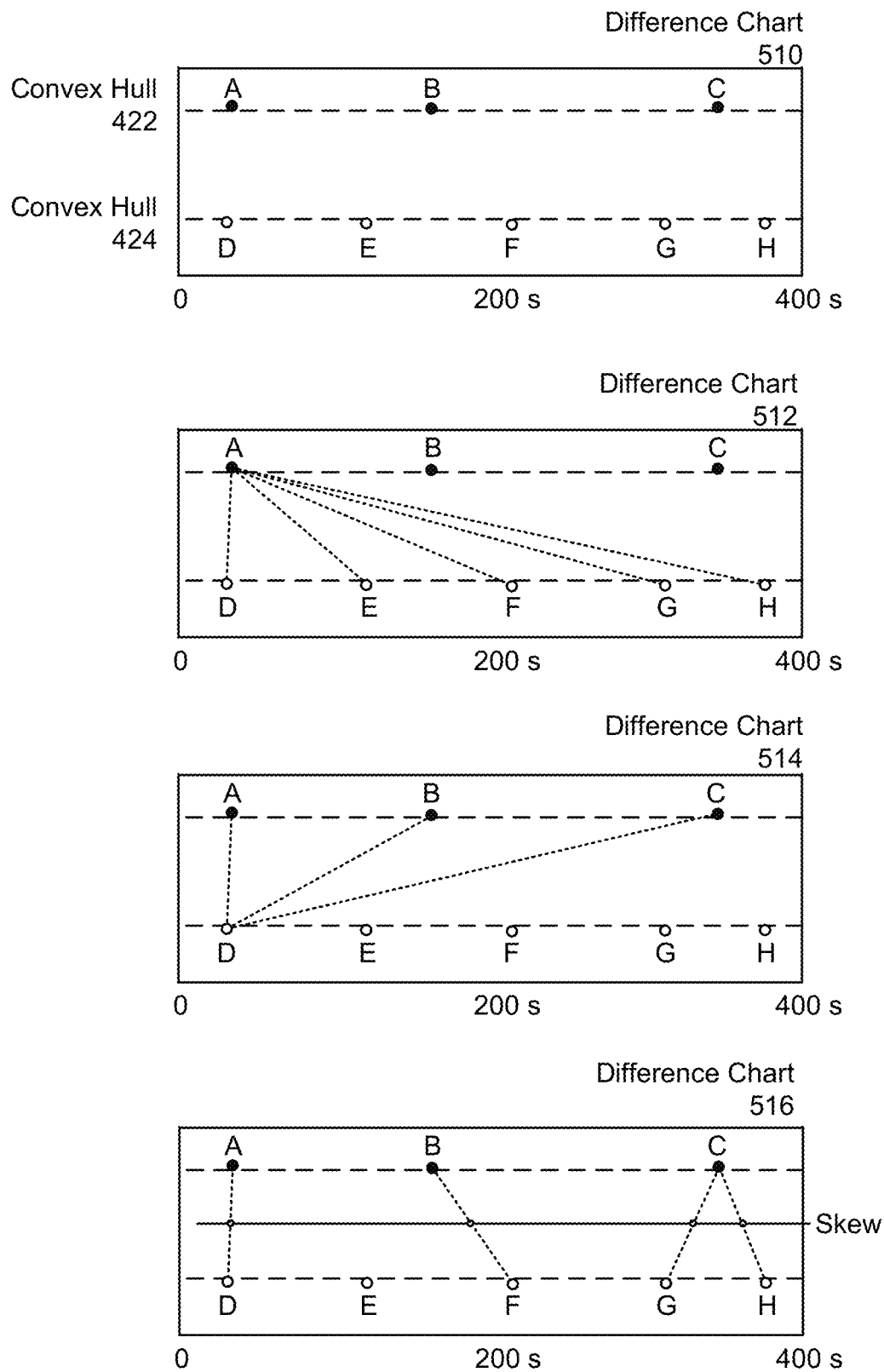

FIGS. 5A-5C illustrate examples of determining skew and drift using control points along convex hulls according to embodiments of the present disclosure. The first device 110a may determine skew by determining a midpoint between the first convex hull 422 and the second convex hull 424. In some examples, the first device 110a may determine skew by determining the shortest distances between the first control points and the second control points and determining midpoints corresponding to the shortest distances. In other examples, the first device 110a may determine first line segments between the first control points and second line segments between the second control points, and may determine skew by determining shortest distances between the control points and opposing line segments. For example, the first device 110a may determine the shortest distances between the first control points and closest points along the second line segments and/or between the second control points and closest points along the first line segments.

FIG. 5A illustrates an example of determining shortest distances between the first control points and the second control points. As illustrated in difference chart 510, the first control points A-C are along the first convex hull 422 and the second control points D-H are along the second convex hull 424. The first device 110a may determine vectors and corresponding vector lengths between each of the first control points and each of the second control points. For example, difference chart 512 illustrates vectors between control point A and each of the second control points D-H, whereas difference chart 514 illustrates vectors between control point D and each of the first control points A-C.

After determining each of the vectors and corresponding vector lengths, the first device 110a may rank the vector lengths and select the shortest length. For example, difference chart 516 illustrates the first device 110a selecting a first vector between control point A and control point D, a second vector between control point B and control point F, a third vector between control point C and control point G and/or a fourth vector between control point C and control point H. In some examples, the first device 110a may select each of the vectors and may determine the skew based on midpoints along the vectors. Thus, the first device 110a may determine the skew based on multiple vectors (e.g., multiple pairs of control points). However, the disclosure is not limited thereto and the first device 110a may determine the skew based on a single vector (e.g., single pair of control points). For example, the first device 110a may determine that the shortest vector length is between control point B and control point F and may determine the skew based on the midpoint along the vector between control point B and control point F.

While not illustrated in FIG. 5A, the first device 110a may determine drift based on the skew values over time. In some examples, the first device 110a may approximate a slope of the skew values over time based on the first line segments and/or the second line segments. For example, if the first device 110a selects the vector between control point B and control point F as the single vector, the first device 110a may determine the drift based on a first slope between control point A, control point B and/or control point C, and/or a second slope between control point E, control point F and/or control point G. However, the disclosure is not limited thereto and the first device 110a may determine the drift based on a slope of any combination of the first line segments, the second line segments, the first convex hull 422 and/or the second convex hull 424 without departing from the disclosure. For example, the first device 110a may approximate the drift based on a slope of the skew values over time, may determine slopes of two or more line segments and approximate the drift based on an average of the slopes, or the like.

FIG. 5B illustrates an example of determining shortest vector lengths between the control points and opposing line segments. For example, the first device 110a may determine the shortest vector lengths between the first control points and closest points along the second line segments and/or between the second control points and closest points along the first line segments. As illustrated in difference chart 520, the first control points A-C are along the first convex hull 422 and the second control points D-H are along the second convex hull 424.

Difference chart 522 illustrates the first device 110a determining vectors and corresponding vector lengths between the first control points and the second line segments. For example, a first vector (1) is between control point A and a point along line segment DE (e.g., line segment between control point D and control point E), the point corresponding to a shortest distance between control point A and the line segment DE (e.g., perpendicular to control point A). Similarly, a second vector (2) is between control point A and a point along line segment EF (e.g., control point E is the closest point), a third vector (3) is between control point B and line segment DE (e.g., control point E is the closest point), a fourth vector (4) is between control point B and line segment EF, a fifth vector (5) is between control point B and line segment FG, a sixth vector (6) is between control point B and line segment GH, a seventh vector (7) is between control point C and line segment EF (e.g., control point F is the closest point), an eighth vector (8) is between control point C and line segment FG (e.g., control point G is the closest point), and a ninth vector (9) is between control point C and line segment GH.

Difference chart 524 illustrates the first device 110a determining vectors and corresponding vector lengths between the second control points and the first line segments. For example, a first vector (1) is between control point D and a point along line segment AB (e.g., control point A is the closest point), a second vector (2) is between control point D and a point along line segment BC (e.g., control point B is the closest point), a third vector (3) is between control point E and a point along line segment AB, a fourth vector (4) is between control point E and line segment BC (e.g., control point B is the closest point), a fifth vector (5) is between control point F and a point along line segment AB (e.g., control point B is the closest point), a sixth vector (6) is between control point F and a point along line segment BC, a seventh vector (7) is between control point G and line segment AB (e.g., control point B is the closest point), an eighth vector (8) is between control point G and a point along line segment BC, a ninth vector (9) is between control point H and line segment AB (e.g., control point B is the closest point), and a tenth vector (10) is between control point H and a point along line segment BC (e.g., control point C is the closest point).

The first device 110a may determine the shortest vector lengths between the control points and opposing line segments. For example, difference chart 526 illustrates a first vector (1) between control point A and a point along line segment DE, a second vector (2) between control point E and a point along line segment AB, a third vector (3) between control point B and a point along line segment EF, a fourth vector (4) between control point F and a point along line segment BC, a fifth vector (5) between control point G and a point along line segment BC, and a sixth vector (6) between control point C and a point along line segment GH. The first device 110a may determine a time, a skew and/or a drift corresponding to one or more of the vectors, as illustrated in FIG. 5C.

FIG. 5C illustrates difference chart 530, which indicates a time corresponding to a midpoint for each vector. For example, the first device 110a may determine a first time value $t_1$ corresponding to the first vector (1), a second time value $t_2$ corresponding to the second vector (2), a third time value $t_3$ corresponding to the third vector (3), a fourth time value $t_4$ corresponding to the fourth vector (4), a fifth time value $t_5$ corresponding to the fifth vector (5), and a sixth time value $t_6$ corresponding to the sixth vector (6).

Similarly, difference chart 532 indicates a skew value corresponding to the midpoint for each vector. For example, the first device 110a may determine a first skew value $sk_1$ corresponding to the first vector (1), a second skew value $sk_2$ corresponding to the second vector (2), a third skew value $sk_3$ corresponding to the third vector (3), a fourth skew value $sk_4$ corresponding to the fourth vector (4), a fifth skew value $sk_5$ corresponding to the fifth vector (5), and a sixth skew value $sk_6$ corresponding to the sixth vector (6).

Finally, difference chart 534 indicates a slope value corresponding to the line segment associated with each vector. For example, the first device 110a may determine a first slope value $slope_{DE}$ corresponding to the first vector (1), a second slope value $slope_{AB}$ corresponding to the second vector (2), a third slope value $slope_{EF}$ corresponding to the third vector (3), a fourth slope value $slope_{BC}$ corresponding to the fourth vector (4) and the fifth vector (5), and a fifth slope value $slope_{GH}$ corresponding to the sixth vector (6).

Synchronization table 540 illustrates each of the vectors along with their corresponding control point, line segment, time value, skew value and drift value. For example, the first vector (1) corresponds to control point A, line segment DE, time value $t_1$, skew value $sk_1$ and $slope_{DE}$. Similarly, the second vector (2) corresponds to control point E, line segment AB, time value $t_2$, skew value $sk_2$ and $slope_{AB}$, the third vector (3) corresponds to control point B, line segment EF, time value $t_3$, skew value $sk_3$ and $slope_{EF}$, the fourth vector (4) corresponds to control point F, line segment BC, time value $t_4$, skew value $sk_4$ and $slope_{BC}$, the fifth vector (5) corresponds to control point G, line segment BC, time value $t_5$, skew value $sk_5$ and $slope_{BC}$, and the sixth vector (6) corresponds to control point C, line segment GH, time value $t_6$, skew value $sk_6$ and $slope_{GH}$.

In some examples, the first device 110a may determine a skew value and/or drift value for a single vector at a time. For example, between the first time value $t_1$ and the second time value $t_2$, the first device 110a may use the first skew value $sk_1$ and the first drift value (e.g., $slope_{DE}$), between the second time time value $t_2$ and the third time value $t_3$, the first device 110a may use the second skew value $sk_2$ and the second drift value (e.g., $slope_{AB}$), and so on. Thus, the synchronization table 540 is a compilation of the previous skew values and/or drift values used over a period of time. However, the disclosure is not limited thereto and the first device 110a may determine skew values and/or drift values for multiple vectors at a time.

As an example of determining skew values and/or drift values for multiple vectors at a time, the first device 110a may determine the synchronization table 540 illustrated in FIG. 5C, including any combination of the vectors 1-6. In some examples, the first device 110a may select from the multiple skew values and/or drift values (e.g., selecting a single skew value and a single drift value) by determining which of the vectors 1-6 has the shortest length (e.g., line of closest approach between the convex hulls) and using the skew value and the drift value for the selected vector. Thus, when there are multiple data points along the convex hulls, the first device 110a may select the data point corresponding to the closest approach and may determine a single skew value and/or drift value based on the selected data point. For example, the first device 110a may use the second skew value $sk_2$ and the second drift value (e.g., $slope_{AB}$) even after determining the vectors 3-6 if the second vector (2) corresponds to the closest approach (e.g., has a shorter length than vectors 1 and 3-6). However, the disclosure is not limited thereto and the first device 110a may determine an estimated skew value and/or an estimated drift value based on two or more vectors without departing from the present disclosure. For example, the first device 110a may determine the estimated skew value based on an average of two or more of the skew values $sk_1$-$sk_6$ and may determine the estimated drift value based on an average of two or more of the drift values (e.g., $slope_{DE}$-$slope_{GH}$).

While FIG. 5C illustrates the first device 110a determining skew values and/or drift values for multiple vectors, this is intended for illustrative purposes only and the disclosure is not limited thereto. For example, the first device 110a may be configured to transition slowly between estimated skew values, as replacing a first skew value $sk_1$ with a second skew value $sk_2$ may result in rapid changes in the estimated skew value.

Figure 6:
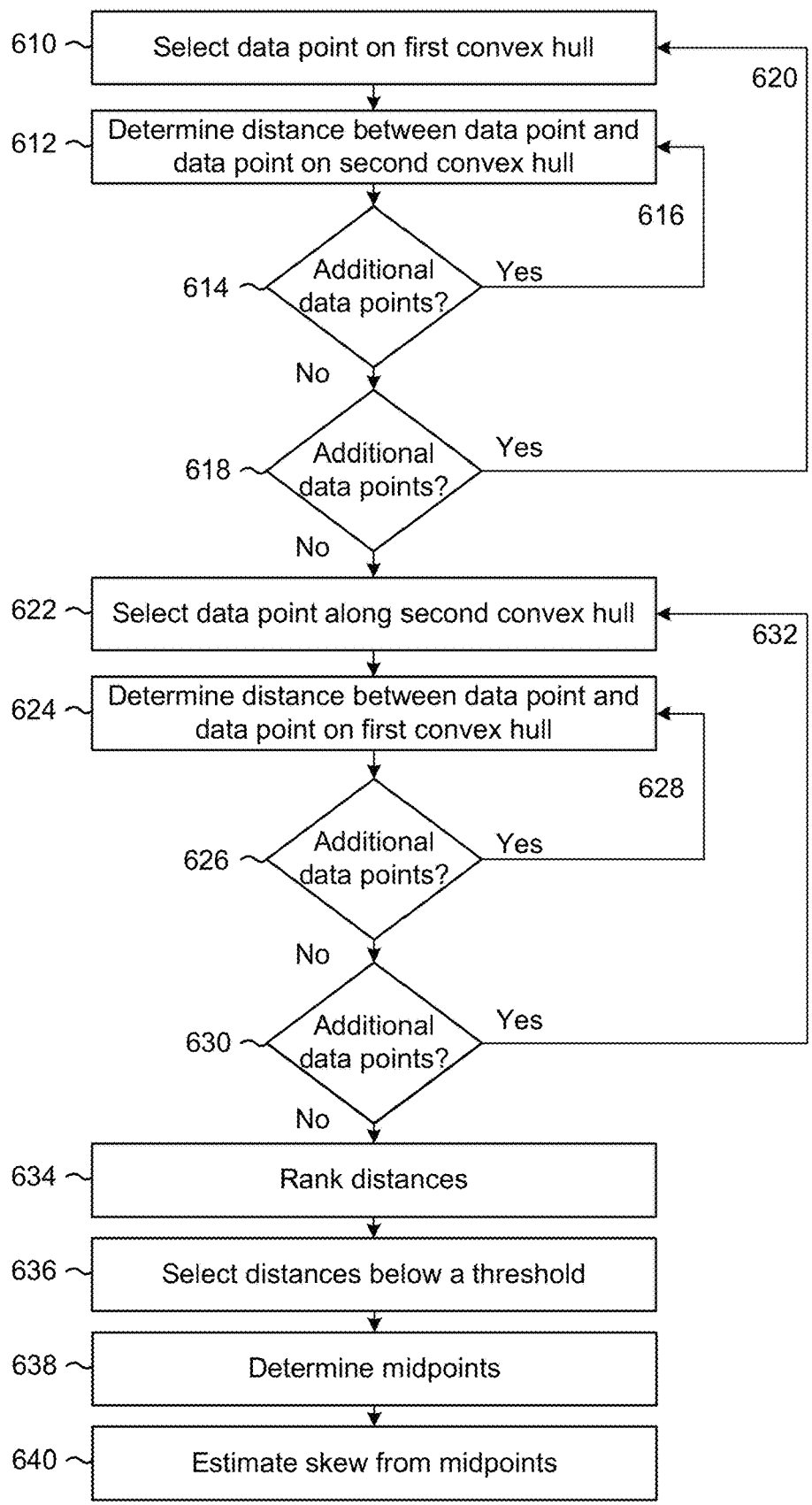
FIG. 6 is a flowchart conceptually illustrating an example method for determining skew according to embodiments of the present disclosure.

FIG. 6 is a flowchart conceptually illustrating an example method for determining skew according to embodiments of the present disclosure. As illustrated in FIG. 6, the first device 110a may select (610) a data point on the first convex hull and may determine (612) a distance between the selected data point and a data point on the second convex hull. The first device 110a may determine (614) whether there are additional data points on the second convex hull and, if so, may loop (616) to step 612 to determine a distance between the selected data point and the additional data point on the second convex hull. If there aren't additional data points on the second convex hull, the first device 110a may determine (618) whether there are additional data points on the first convex hull and, if so, may loop (620) to step 610 to repeat steps 610-616 for the additional data point.

If there are no more data points on the first convex hull, the first device 110a may select (622) a data point along the second convex hull and may determine (624) a distance between the selected data point and a data point on the first convex hull. The first device 110a may determine (626) whether there are additional data points on the first convex hull and, if so, may loop (628) to step 624 to determine a distance between the selected data point and the additional data point on the first convex hull. If there aren't additional data points on the first convex hull, the first device 110a may determine (630) if there are additional data points on the second convex hull and, if so, may loop (632) to step 622 to repeat steps 622-626 for the additional data points.

The first device 110a may rank (634) distances and may select (636) distances below a threshold. For example, the first device 110a may select a single distance (e.g., minimum distance) or may select two or more distances without departing from the disclosure. The first device 110a may determine (638) midpoints between the first convex hull and the second convex hull and may estimate (640) a skew from the midpoints.

Figure 7:
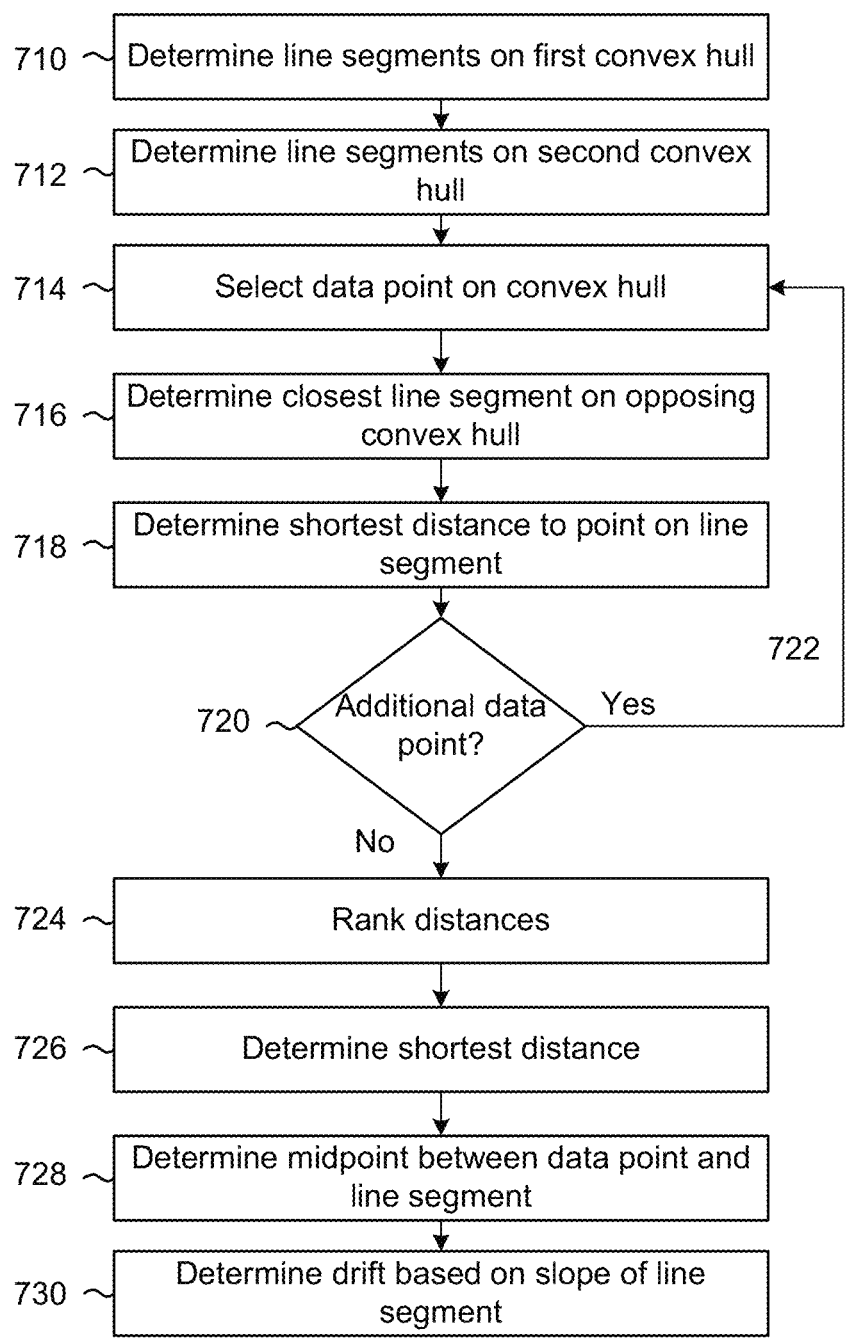
FIG. 7 is a flowchart conceptually illustrating an example method for determining skew and drift according to embodiments of the present disclosure.

FIG. 7 is a flowchart conceptually illustrating an example method for determining skew and drift according to embodiments of the present disclosure. As illustrated in FIG. 7, the first device 110a may determine (710) line segments on the first convex hull and may determine (712) line segments on the second convex hull. The first device 110a may select (714) a data point on a convex hull (e.g., either the first convex hull or the second convex hull), may determine (716) a closest line segment on an opposing convex hull and may determine (718) a shortest distance to a point on the line segment. The first device 110a may determine (720) whether there is an additional data point and, if so, may loop (722) to step 714 to repeat steps 714-720 for the additional data point.

If there are no additional data points, the first device 110a may rank (724) distances, may determine (726) a shortest distance, may determine (728) a midpoint between the data point and the line segment and may determine (730) a drift value based on a slope of the line segment, as discussed above with regard to FIGS. 5B-5C. While FIG. 7 illustrates an example of approximating the drift based on a slope of the line segment, the disclosure is not limited thereto and the first device 110a may determine the drift using other techniques known to one of skill in the art without departing from the disclosure. For example, the first device 110a may approximate the drift based on a slope of the skew values over time, may determine slopes of two or more line segments and approximate the drift based on an average of the slopes, or the like.

While FIGS. 4A-5C illustrate a simple example that doesn't include drift between the first clock and the second clock, the disclosure is not limited thereto and typically, there is drift between the first clock and the second clock that varies over time. Positive drift results in the control points increasing over time (e.g., increasing skew), whereas negative drift results in the control points decreasing over time (e.g., decreasing skew).

FIGS. 8A-8C illustrate examples of determining skew and drift using control points along convex hulls according to embodiments of the present disclosure. As illustrated in FIG. 8A, a difference chart 810 plots first direction exchanges 812, which correspond to packets sent from the first device 110a to the second device 110b (e.g., T2−T1), and second direction exchanges 814, which correspond to packets sent from the second device 110b to the first device 110a (e.g., T3−T4). As illustrated in FIG. 8A, the first direction exchanges 812 and the second direction exchanges 814 are randomly distributed, although there may be a distinct pattern caused by the variable buffers included in the network(s) 10. The first direction exchanges 812 are larger than the second direction exchanges 814 because of the positive transit time caused by subtracting the first timestamp T1 from the second timestamp T2, whereas the second direction exchanges 814 are smaller than the first direction exchanges 812 because of the negative transit time caused by subtracting the fourth timestamp T4 from the third timestamp T3.

As illustrated in FIG. 8A, the first direction exchanges 812 are separated from the second direction exchanges 814 by a gap corresponding to the transit times. The gap may be centered around the skew between the first clock of the first device 110a and the second clock of the second device 110b. Due to a drift between the first clock and the second clock, the skew slopes downward as time progresses.

To determine the skew, the first device 110a may select a portion of the first direction exchanges 812 and the second direction exchanges 814 as control points. For example, the first device 110a may select first control points from the first direction exchanges 812 that have the smallest values (e.g., just above the gap), which correspond to fastest transit times from the first device 110a to the second device 110b, and may select second control points from the second direction exchanges 814 that have the largest values (e.g., just below the gap), which correspond to the fastest transit times from the second device 110b to the first device 110a.

In order to select the control points, in some examples the first device 110a may determine a first convex hull 822 that encloses the first direction exchanges 812 and a second convex hull 824 that encloses the second direction exchanges 814, as illustrated in difference chart 820 in FIG. 8B. The first convex hull 822 of the first direction exchanges 812 is the smallest convex set that contains the first direction exchanges 812, which may be visualized as the shape enclosed by a rubber band stretched around the first direction exchanges 812. While the first convex hull 822 may appear to be a straight line, the first convex hull 822 actually varies over time and may include a series of line segments and/or curves based on the first direction exchanges 812. Similarly, the second convex hull 824 of the second direction exchanges 814 is the smallest convex set that contains the second direction exchanges 814, which may be visualized as the shape enclosed by a rubber band stretched around the second direction exchanges 814. While the second convex hull 824 may appear to be a straight line, the first convex hull 822 actually varies over time and may include a series of line segments and/or curves based on the second direction exchanges 814.

As illustrated in FIG. 8B, the first convex hull 822 and the second convex hull 824 are adjacent to the gap between the first direction exchanges 812 and the second direction exchanges 814. The first device 110*a* may select first control points along the first convex hull 822 adjacent to the gap and select the second control points along the second convex hull 824 adjacent to the gap. Thus, the first device 110*a* may use the first control points and the second control points to determine the skew between the first clock and the second clock that is centered in the gap, as discussed above with regard to FIGS. 5A-5C. In addition, the first device 110*a* may use the first control points and the second control points to determine a drift between the first clock and the second clock by approximating a slope of skew values over time. For example, the first device 110*a* may select first control points that are closest to the first convex hull 822, may determine first line segments extending between the first control points, may select second control points that are closest to the second convex hull 824 and may determine second line segments extending between the second control points. The first device 110*a* may determine vectors and corresponding vector lengths between the first control points and the second line segments and/or the second control points and the first line segments. The first device 110*a* may select vector(s) associated with a shortest distance between the first convex hull 822 and the second convex hull 824 and may determine the skew based on midpoint(s) of the vector(s) and may determine drift value(s) based on slope(s) of the corresponding line segment(s).

FIG. 8C illustrates a difference chart 830 that includes an estimate of skew over time 840, indicated by a thick solid line, that is centered in the gap between the first convex hull 822 and the second convex hull 824. As illustrated in FIG. 8C, the estimate of the skew varies over time based on the drift. Thus, in order to calculate the skew at any point in time, the first device 110*a* may determine the amount of time elapsed from a previous skew estimate and compensate for the drift corresponding to the elapsed time. For example, in contrast to the skew being relatively stable (e.g., 10000 ms for a duration of time) in the examples illustrated in FIGS. 4A-4B, FIG. 8C illustrates that the first device 110*a* may estimate a specific skew value (e.g., point along the y axis) corresponding to a specific time (e.g., point along the x axis). Thus, the skew does not correspond to a single value (e.g., corresponding to a one-dimensional point) but instead varies over time (e.g., corresponding to a two-dimensional line estimate). For ease of explanation, the following description may refer to determining a skew value (e.g., point along the y axis) without specifying that the skew value corresponds to a specific time (e.g., point along the x axis). However, the first device 110*a* may only use the estimated skew value for a duration of time (e.g., around the specific time) before the estimated skew value is inaccurate.

In addition, the difference chart 830 visually depicts key performance indicators (KPIs) that indicate different metrics associated with audio. For example, a first KPI corresponds to multi-room audio (e.g., playing audio over multiple speakers positioned in separate rooms) and includes +5 ms 832 and −5 ms 838. Thus, in order to play multi-room audio without echo, the first device 110*a* must be configured to estimate the skew over time 840 within the range from −5 ms 838 to +5 ms 832. A second KPI is more challenging and corresponds to Left-Right stereo audio (e.g., center panned vocalist) and includes +150 μs 834 and −150 μs 836. Thus, in order to play stereo audio with the center panned vocalist remaining in the center and not shifting left or right, the first device 110*a* must be configured to estimate the skew over time 840 within the range from −150 μs 836 to +150 μs 834.

When the first device 110*a* initially connects to the second device 110*b* and begins plotting the first direction exchanges 812 and the second direction exchanges 814, the first convex hull 822 and the second convex hull 824 have not yet converged and the estimated skew value (e.g., based on the skew over time 840) may be incorrect. Thus, the first device 110*a* may not reliably determine an estimated skew value and/or a drift until the first direction exchanges 812 and the second direction exchanges 814 include enough data points that the first convex hull 822 and the second convex hull 824 become stable (e.g., convergence), which may correspond to a minimum transit time.

In some examples, the first device 110*a* may estimate the skew and/or the drift prior to reaching convergence. For example, the first device 110*a* may retrieve a previous drift value associated with a previous connection between the devices. Thus, the first device 110*a* may estimate a current skew value based on the first direction exchanges 812 and the second direction exchanges 814 and may estimate future skew values based on the current skew value and the previous drift value. Additionally or alternatively, the first device 110*a* may determine that an estimated drift value is outside of a desired range and may set the drift value equal to zero. For example, the first clock and the second clock may be accurate within +/−20 ppm, resulting in a maximum drift of +/−40 ppm. If the estimated drift value exceeds +/−40 ppm, the first device 110*a* may determine that the drift value is invalid and may substitute the value of zero when estimating future skew values.

Figure 9A:
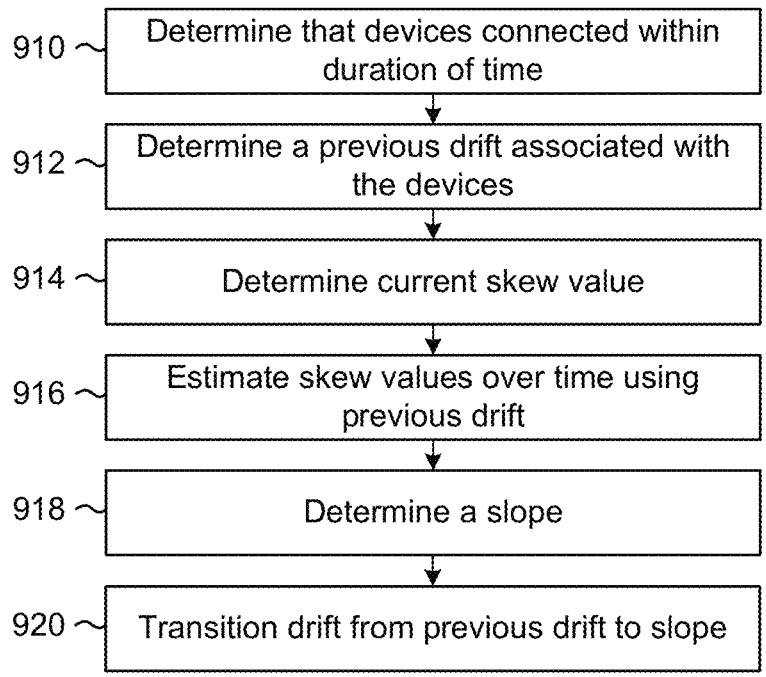
FIGS. 9A-9B are flowcharts conceptually illustrating example methods for estimating drift prior to convergence according to embodiments of the present disclosure.
Figure 9B:
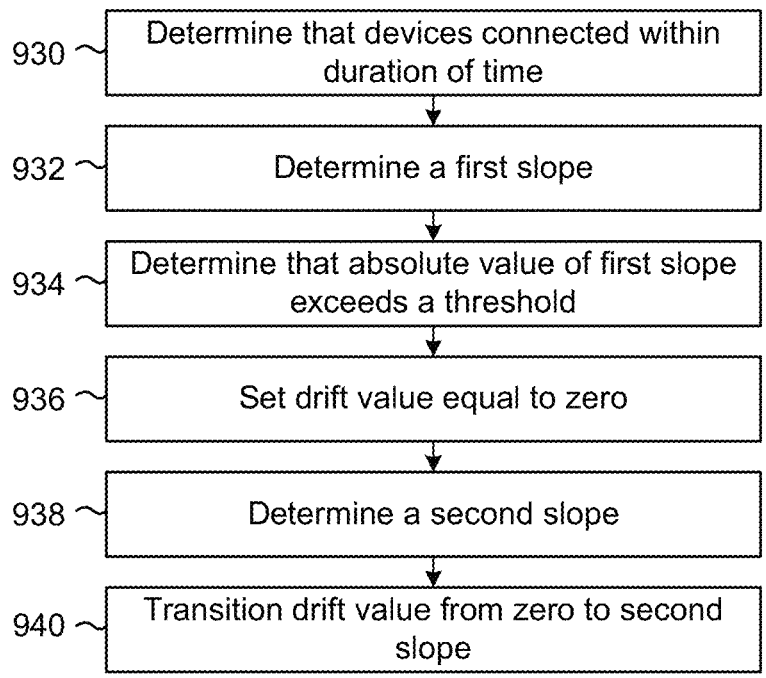

FIGS. 9A-9B are flowcharts conceptually illustrating example methods for estimating drift prior to convergence according to embodiments of the present disclosure. As illustrated in FIG. 9A, the first device 110*a* may determine (910) that devices have been connected within a duration of time. For example, the first device 110*a* may determine that the first device 110*a* connected to the second device 110*b* within the duration of time and has not reached convergence (e.g., convex hulls have not converged to a stable value). The first device 110*a* may determine (912) a previous drift associated with the devices and may determine (914) a current skew value based on current timestamp exchanges. For example, as drift values may be relatively constant over time, with minor variations due to temperature or the like, a previous drift value may be an approximation of a current drift value. In contrast, as skew values may vary after the first device 110*a* and/or the second device 110*b* reboot (e.g., whenever either clock restarts), the first device 110*a* may determine the current skew value whenever the first device 110*a* connects to the second device 110*b*. While drift values require sufficient data points for the convex hulls to converge to a stable value, skew values may be determined from a single timestamp exchange. Until the convex hulls have converged to a stable value, the first device 110a may estimate (916) skew values over time using the previous drift. For example, the first device 110a may determine the previous drift from the last time that the first device 110a was connected to the second device 110b and may use the previous drift and a current skew value to estimate future skew values.

After the convex hulls have converged to a stable value, the first device 110a may determine (918) a slope associated with the control points along the first convex hull and the second convex hull and may transition (920) the drift from the previous drift to the slope. Thus, the first device 110a may estimate the skew based on the previous drift until convergence, at which point the first device 110a may determine the actual drift.

As illustrated in FIG. 9B, the first device 110a may determine (930) that devices connected within the duration of time and may determine (932) a first slope using the first direction exchanges and the second direction exchanges. The first device 110a may determine (934) that an absolute value of the first slope exceeds a threshold and may set the drift value equal to zero. For example, the first clock and the second clock may be accurate within +/−20 ppm, meaning a maximum drift is less than +/−40 ppm. Thus, the first slope may not exceed 40 ppm without being considered an error, in which case the first device 110a sets the drift value to zero instead of using the first slope.

After the convex hulls have converged to a stable value, the first device 110a may determine (938) a second slope associated with the control points along the first convex hull and the second convex hull and may transition (940) the drift from zero to the second slope. Thus, the first device 110a may estimate the skew without drift until convergence, at which point the first device 110a may determine the actual drift.

Figure 10A:
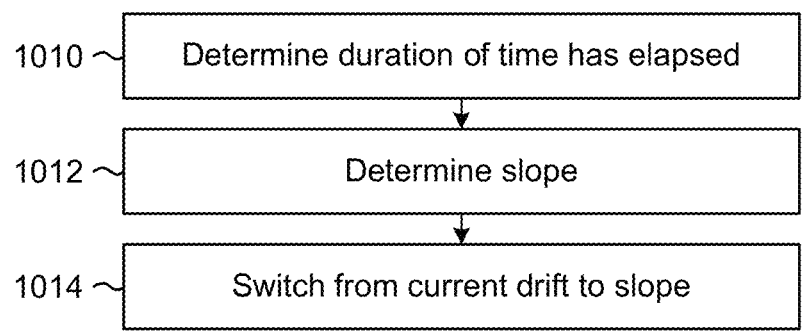
FIGS. 10A-10B are flowcharts conceptually illustrating example methods for transitioning between drift values after convergence according to embodiments of the present disclosure.
Figure 10B:
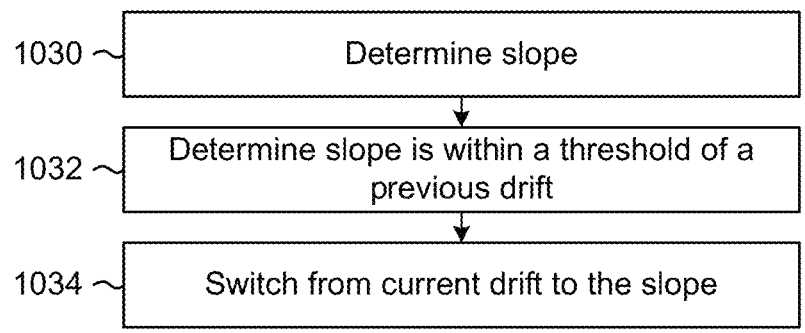

FIGS. 10A-10B are flowcharts conceptually illustrating example methods for transitioning between drift values after convergence according to embodiments of the present disclosure. As illustrated in FIG. 10A, the first device 110a may determine (1010) that a duration of time has elapsed, determine (1012) a slope and may switch (1014) from the current drift to the slope. For example, the first device 110a may determine the slope of line segments between control points, as described above with regard to FIGS. 5A-5C. After the duration of time has elapsed, the first device 110a may switch from the current drift value to the slope.

As illustrated in FIG. 10B, the first device 110a may determine (1030) a slope, may determine (1032) that the slope is within a threshold of a previous drift and may switch (1032) from the current drift value to the slope. For example, the first device 110a may retrieve the previous drift from when the first device 110a last connected to the second device 110b, may determine slopes associated with the control points and may determine that the convex hulls have converged when the slope is within a percentage of the previous drift.

While FIGS. 10A-10B refer to switching between the current drift to the slope, this does not imply that the switch is sudden and the first device 110a may slowly transition from the current drift to the slope without departing from the disclosure. For example, after connecting to the second device 110b, the first device 110a may collect data points (e.g., timestamp exchanges) and determine a current skew value based on the data points. Prior to the convex hulls converging, the first device 110a may estimate the skew value over time based on the current skew value and the current drift (e.g., previous drift, drift value of zero, etc.). As the convex hulls converge, the first device 110a may estimate the skew value over time based on the estimated skew values and a combination of the current drift and the slope. For example, the first device 110a may use a weighting technique to average between the current drift and the slope, smoothly transitioning from the current drift to the slope.

FIG. 11 illustrates examples of expiring data points according to embodiments of the present disclosure. As the convex hulls converge to stable values, the control points may change. For example, additional timestamp exchanges may occur that are closer to the minimum transit time, pushing the convex hulls closer to the middle of the gap between the first direction exchanges and the second direction exchanges. As the convex hulls change, previous control points may be replaced by newer control points. For example, FIG. 11 illustrates a difference chart including previous points 1112 that were previously used as control points but were removed as the convex hull moved closer to the middle of the gap.

Additionally or alternatively, the first device 110a may retire old data points after a certain time in order to maintain an accuracy of the skew estimate. For example, after a fixed period of time (e.g., an hour), the first device 110a may remove old data 1114 and recalculate the convex hulls and corresponding control points in order to determine the skew and the drift based on the control points.

In some examples, the first device 110a may need to reset the estimate of the skew and/or drift by removing data points before the fixed period of time. For example, if the estimate of the skew and/or drift becomes inaccurate, the first device 110a may remove the data points and recalculate the convex hulls based on new data points. If the first device 110a does not remove the data points, the skew estimated by the first device 110a may continue to be inaccurate until the data points are removed after an hour.

Figure 12:
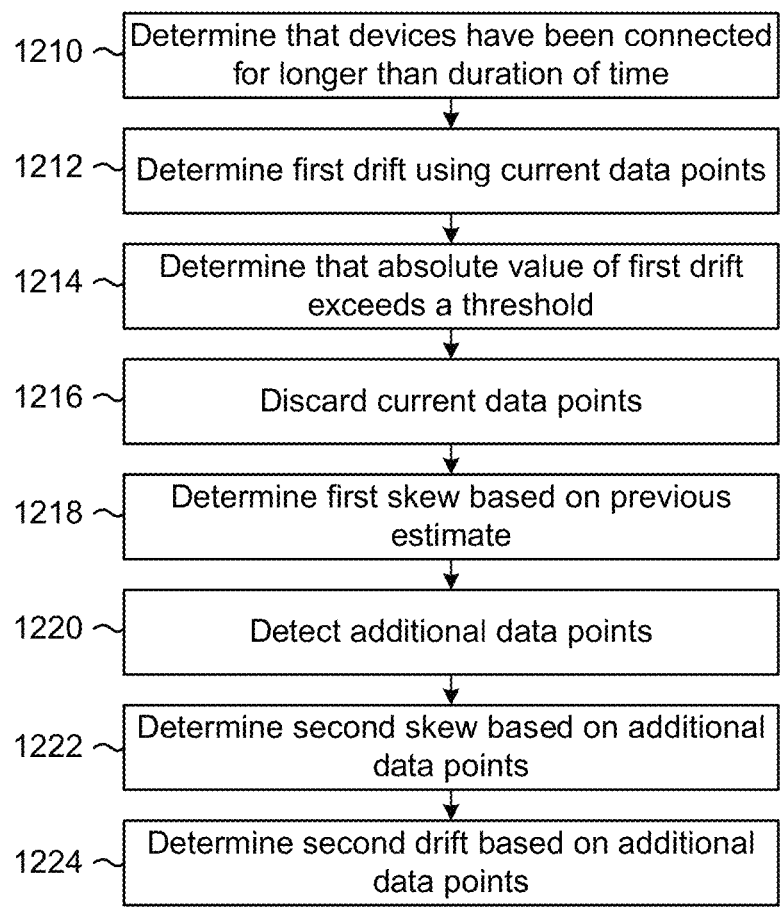
FIG. 12 is a flowchart conceptually illustrating an example method for triggering a reset according to embodiments of the present disclosure.

FIG. 12 is a flowchart conceptually illustrating an example method for triggering a reset according to embodiments of the present disclosure. As illustrated in FIG. 12, the first device 110a may determine (1210) that the devices have been connected for longer than a duration of time. For example, the first device 110a may determinate that the convex hulls are no longer converging. The first device 110a may determine (1212) a first drift using current data points, may determine (1214) that an absolute value of the first drift exceeds a threshold and may discard (1216) the current data points. For example, the first drift may exceed the +/−40 ppm maximum drift between the first clock and the second clock.

The first device 110a may determine (1218) a first skew value based on a previous estimate and may detect (1220) additional data points (e.g., timestamp exchanges). The first device 110a may determine (1222) a second skew value based on the additional data points and may determine (1224) a second drift value based on the additional data points. Thus, the first device 110a may remove the current data points and recalculate the convex hulls based on additional data points.

In some examples, the first device 110a may detect a change in network parameters, such as a change in service set identifier (SSID), basic service set identifier (BSSID), a frequency band (e.g., 2.4 GHz, 5 GHz, etc.), a throughput or the like. Based on the change in network parameters, the first device 110a may anticipate changes to the convex hulls and may remove current data points and recalculate the convex hulls. Additionally or alternatively, based on the change in network parameters, the first device 110a may anticipate changes to the convex hulls and may retrieve previous data points, previous drift estimates, and/or previous skew values.

Figure 13A:
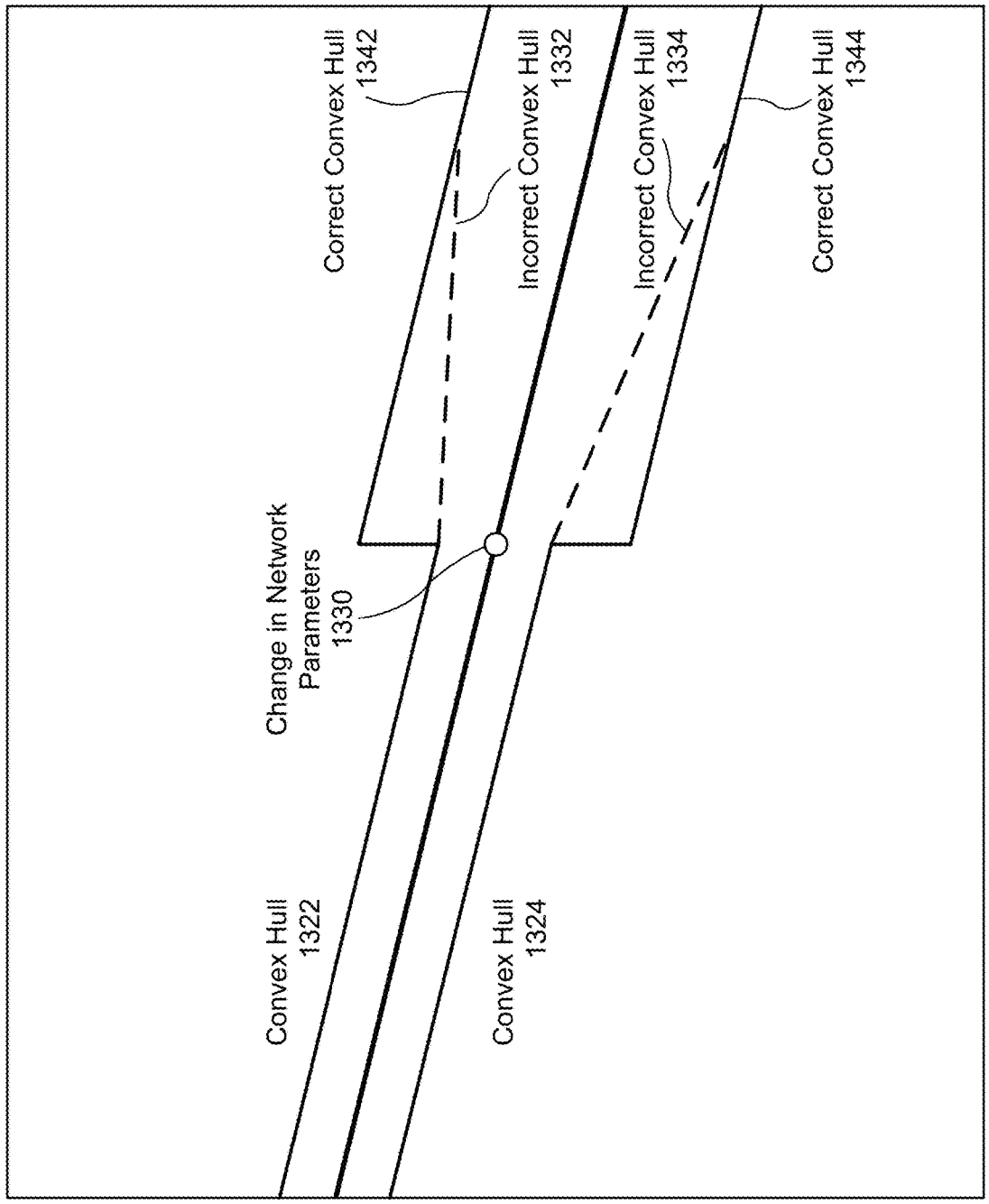
FIGS. 13A-13B illustrate examples of compensating for changes in network parameters according to embodiments of the present disclosure.
Figure 13B:
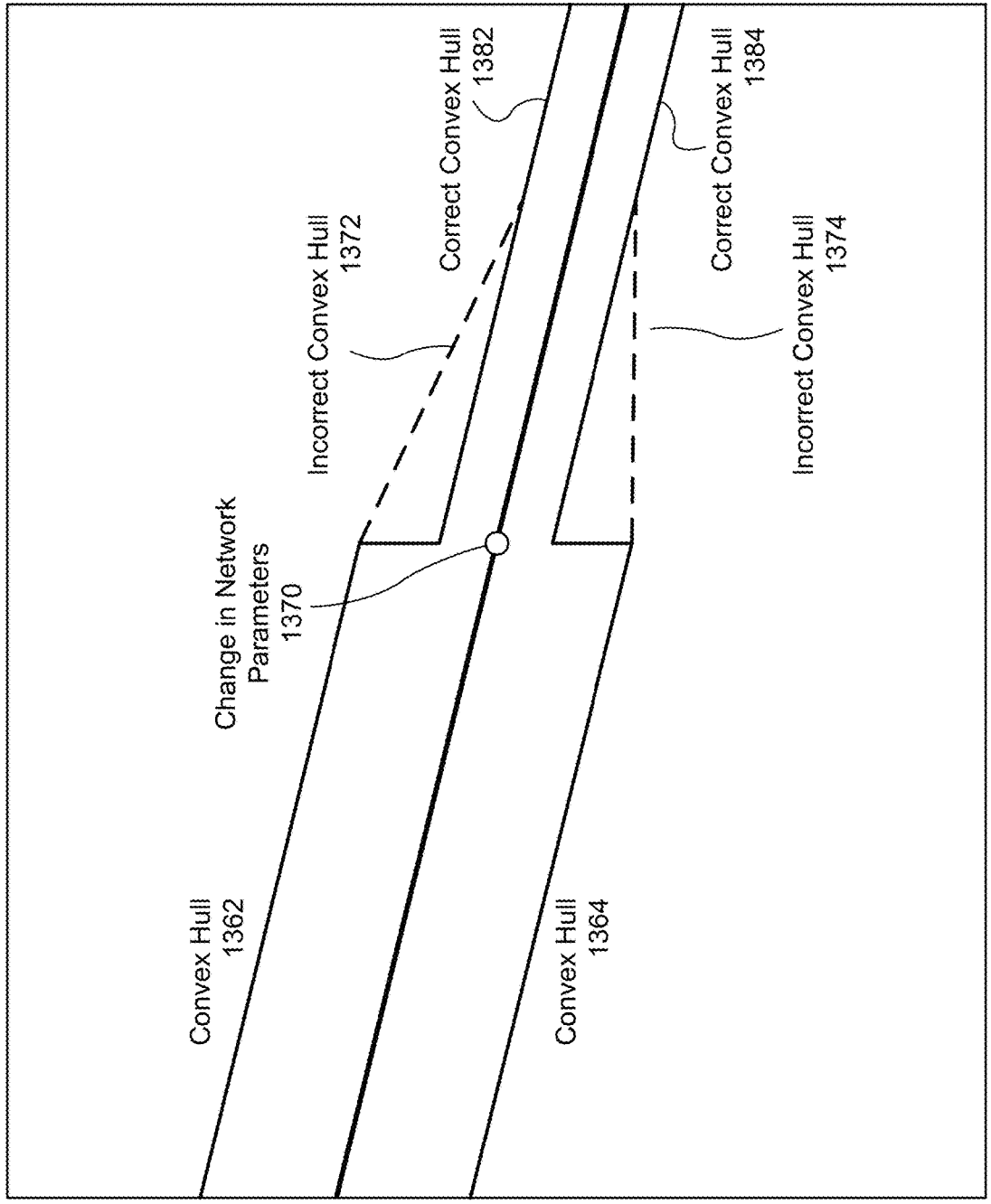

FIGS. 13A-13B illustrate examples of compensating for changes in network parameters according to embodiments of the present disclosure. As illustrated in FIG. 13A, the first device 110a may determine a first convex hull 1322 and a second convex hull 1324, as shown in difference chart 1310. At some point, the first device 110a may detect a change in network parameters 1330, such as a change in service set identifier (SSID), basic service set identifier (BSSID), a frequency band (e.g., 2.4 GHz, 5 GHz, etc.), a throughput or the like. For example, the first device 110a may switch from a first connection to the second device 110b (e.g., first device 110a to an access point to the second device 110b) to a second connection to the second device 110b (e.g., first device 110a to a range extender to the access point to the second device 110b).

Due to the range extender, the second connection may have an increased transit time between the first device 110a and the second device 110b. Thus, at a specific time (e.g., point along the x axis corresponding to the change in network parameters 1330), the transit time (e.g., gap between the convex hulls) will suddenly increase as values of first data points (e.g., timestamp exchanges in a first direction) will increase (e.g., move up along the y axis) and values of second data points (e.g., timestamp exchanges in a second direction) will decrease (e.g., move down along the y axis). If the first device 110a leaves the current data points (e.g., data points before the change in network parameters 1330), the first device 110a may transition from the first convex hull 1322 to a first incorrect convex hull 1332 and from the second convex hull 1324 to a second incorrect convex hull 1334. Using the first incorrect hull 1332 and the second incorrect hull 1334 may prevent the first device 110a from accurately estimating the skew and/or the drift. For example, the first device 110a may not converge on a first correct convex hull 1342 and a second correct convex hull 1344 until the current data points expire, which may not occur for up to an hour.

As illustrated in the difference chart 1310, if the first device 110a removes the current data points, the first device 110a may recalculate the convex hulls and may determine the first correct convex hull 1342 and the second correct convex hull 1344. Thus, as the first device 110a changes from the first connection to the second connection, the first device 110a may discard the current data points, which are associated with the first connection, and recalculate the convex hull based on data points associated with the second connection.

While FIG. 13A illustrates the transit times suddenly increasing, the disclosure is not limited thereto and in some examples the transit times will suddenly decrease. As illustrated in FIG. 13B, the first device 110a may determine a first convex hull 1362 and a second convex hull 1364, as shown in difference chart 1350. At some point, the first device 110a may detect a change in network parameters 1370, such as a change in service set identifier (SSID), basic service set identifier (BSSID), a frequency band (e.g., 2.4 GHz, 5 GHz, etc.), a throughput or the like. For example, the first device 110a may switch from the second connection to the second device 110b (e.g., first device 110a to the range extender to the access point to the second device 110b) to the first connection to the second device 110b (e.g., first device 110a to the access point to the second device 110b).

Due to not using the range extender, the first connection may have a decreased transit time between the first device 110a and the second device 110b. Thus, at a specific time (e.g., point along the x axis corresponding to the change in network parameters 1370), the transit time (e.g., gap between the convex hulls) will suddenly decrease as values of first data points (e.g., timestamp exchanges in a first direction) will decrease (e.g., move down along the y axis) and values of second data points (e.g., timestamp exchanges in a second direction) will increase (e.g., move up along the y axis). If the first device 110a leaves the current data points (e.g., data points before the change in network parameters 1370), the first device 110a may transition from the first convex hull 1362 to a first incorrect convex hull 1372 and from the second convex hull 1364 to a second incorrect convex hull 1374. Using the first incorrect hull 1372 and the second incorrect hull 1374 may prevent the first device 110a from accurately estimating the skew and/or the drift. For example, the first device 110a may not converge on a first correct convex hull 1382 and a second correct convex hull 1384 until the current data points expire, which may not occur for up to an hour.

As illustrated in the difference chart 1350, if the first device 110a removes the current data points, the first device 110a may recalculate the convex hulls and may determine the first correct convex hull 1382 and the second correct convex hull 1384. Thus, as the first device 110a changes from the second connection to the first connection, the first device 110a may discard the current data points, which are associated with the second connection, and recalculate the convex hull based on data points associated with the first connection.

In some examples, the first device 110a may continue using the previous skew estimate (e.g., previous drift) until the second connection converges on the correct convex hulls. Thus, the first device 110a may continue estimating the skew based on the previous skew estimate while determining the skew and/or drift associated with the second connection.

Additionally or alternatively, the first device 110a may include multiple time synchronizers (e.g., circuitry configured to determine skew and/or drift and estimate skew values over time) and may switch between the time synchronizers based on changes to the network parameters. For example, the first device 110a may have a first time synchronizer associated with the first connection and a second time synchronizer associated with the second connection. Thus, when the first device 110a detects the changes to the network parameter(s) indicating that the first device 110a is switching from the first connection to the second connection, the first device 110a may associate the current data points with the first time synchronizer and may retrieve previous data points associated with the second time synchronizer. In some examples, the multiple time synchronizers may correspond to separate circuitry, such as a first circuitry corresponding to the first time synchronizer and second circuitry corresponding to the second time synchronizer. However, the disclosure is not limited thereto and the multiple time synchronizers may instead correspond to different sets of data points. Thus, a single time synchronizer may estimate first skew values using a first set of data points corresponding to the first connection and may estimate second skew values using a second set of data points corresponding to the second connection.

In some examples, the first device 110a may retrieve previous skew and/or drift estimates associated with the second time synchronizer. As additional data points are received, the additional data points may be combined with the previous data points within the second time synchronizer to generate the correct convex hulls. If the first device 110a switches back to the first connection, the first device 110a may associate the data points received using the second connection with the second time synchronizer and retrieve previous data points associated with the first time synchronizer to calculate updated convex hulls. Thus, the first device 110a may switch between the multiple time synchronizers depending on the network configuration.

Figure 14A:
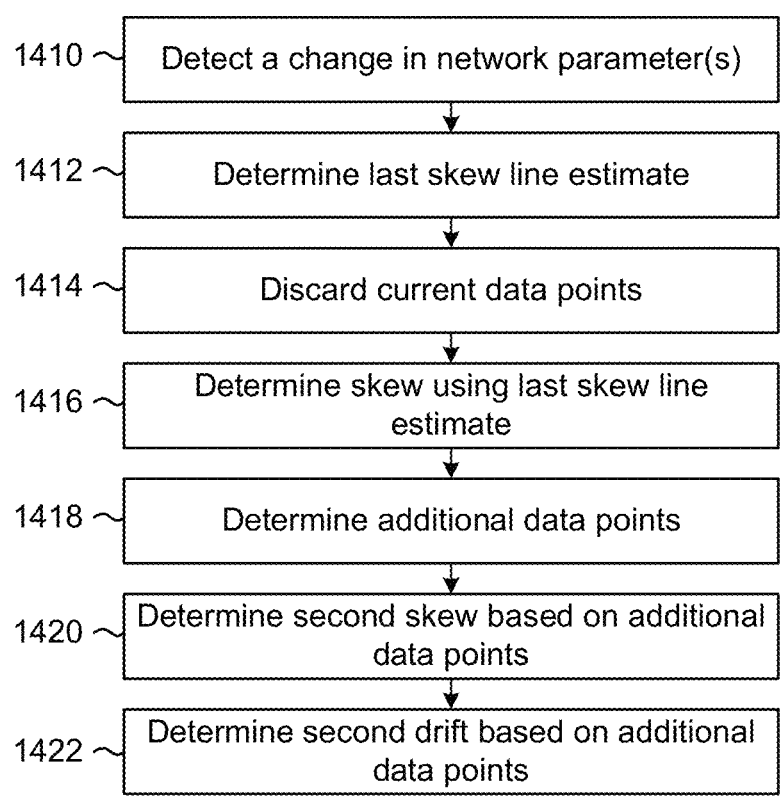
FIGS. 14A-14B are flowcharts conceptually illustrating example methods for estimating skew and drift after detecting changes to network parameters according to embodiments of the present disclosure.
Figure 14B:
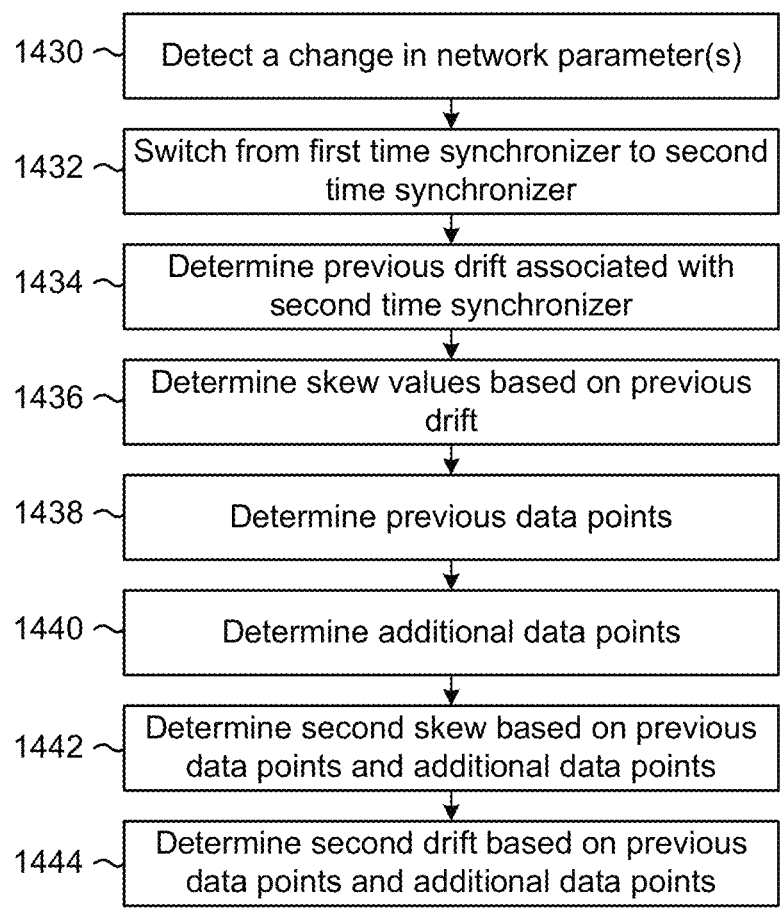

FIGS. 14A-14B are flowcharts conceptually illustrating example methods for estimating skew and drift after detecting changes to network parameters according to embodiments of the present disclosure. As illustrated in FIG. 14A, the first device 110a may detect (1410) a change in network parameter(s), may determine (1412) a last skew line estimate, may discard (1414) current data points and may determine (1416) a skew value using the last skew line estimate. The first device 110a may determine (1418) additional data points, determine (1420) a second skew value based on the additional data points and may determine (1422) a second drift value based on the additional data points.

As illustrated in FIG. 14B, the first device 110a may detect (1430) a change in network parameter(s), may switch (1432) from a first time synchronizer to a second time synchronizer, may determine (1434) a previous drift associated with the second time synchronizer, and may determine (1436) skew values over time based on the previous drift. For example, the first device 110a may use a previous skew value and/or determine a current skew value based on current timestamp exchanges. While drift values require sufficient data points for the convex hulls to converge to a stable value, skew values may be determined from a single timestamp exchange.

The first device 110a may determine (1438) previous data points associated with the second time synchronizer, may determine (1440) additional data points after the change in the network parameter(s), may determine (1442) a second skew value based on previous data points and additional data points and may determine (1444) a second drift value based on the previous data points and the additional data points.

FIG. 15 illustrates an example of a computer network for use with the system according to examples of the present disclosure. As illustrated in FIG. 15, devices 110 may contain components of the system 100 and may be connected over network(s) 10. The network(s) 10 may be a local or private network or may be part of a wider network. For example, the network(s) 10 may include a wired local area network (LAN), a wireless local area network (WLAN) (such as WiFi), Bluetooth, and/or wireless network, such as a Long Term Evolution (LTE) network, WiMAX network, 3G network, etc.

Devices 110 may be connected to the network(s) 10 through either wired or wireless connections. For example, a speech controlled device 110a, an audio output device 110b, a media device 110c, a smart television 110d, a headless device 110e connected to a television 1510, a tablet computer 110f, a laptop computer 110g, and/or a smartphone 110h may be connected to the network(s) 10 through a wired and/or wireless connection. Thus, while the examples illustrated above are directed to the speech controlled device 110a and the audio output device 110b, the disclosure is not limited thereto and the device 110 may be any device capable of performing time synchronization.

FIG. 16 is a block diagram conceptually illustrating example components of a system 100 configured to perform time synchronization according to embodiments of the present disclosure. In operation, the system 100 may include computer-readable and computer-executable instructions that reside on the device 110, as will be discussed further below. The device 110 may include an audio output device for producing sound, such as speaker(s) 1616, and the audio output device 1616 may be integrated into the device 110 or may be separate. The device 110 may be an electronic device capable of receiving audio data, sending audio data and/or outputting the audio data using precise timing. For example, the device 110 may output the audio data in synchronization with audio data output by other speaker(s) and/or device(s). Examples of electronic devices may include computers (e.g., a desktop, a laptop, a server or the like), portable devices (e.g., smart phone, tablet, speech controlled devices or the like), media devices (e.g., televisions, video game consoles, or the like), or the like. The device 110 may also be a component of any of the abovementioned devices or systems.

As illustrated in FIG. 16, the device 110 may include an address/data bus 1602 for conveying data among components of the device 110. Each component within the device 110 may also be directly connected to other components in addition to (or instead of) being connected to other components across the bus 1602.

The device 110 may include one or more controllers/processors 1604, that may each include a central processing unit (CPU) for processing data and computer-readable instructions, and a memory 1606 for storing data and instructions. The memory 1606 may include volatile random access memory (RAM), non-volatile read only memory (ROM), non-volatile magnetoresistive (MRAM) and/or other types of memory. The device 110 may also include a data storage component 1608, for storing data and controller/processor-executable instructions (e.g., instructions to perform the algorithms illustrated in FIGS. 1, 6, 7, 9A-9B, 10A-10B, 12, and/or 14A-14B). The data storage component 1608 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1610.

The device 110 includes input/output device interfaces 1610. A variety of components may be connected through the input/output device interfaces 1610, such as the speaker 1616, microphone(s) (not illustrated), wireless speaker(s) (not illustrated) or the like. The input/output interfaces 1610 may include digital to analog (D/A) converters for converting audio signals into an analog current to drive the speaker(s) 1616, if the speaker(s) 1616 are integrated with or hardwired to the device 110. However, if the speaker(s) 1616 are independent, the D/A converters will be included with the speaker(s) 1616, and may be clocked independent of the clocking of the device 110 (e.g., conventional Bluetooth speakers). Likewise, the input/output interfaces 1610 may include analog to digital (A/D) converters for converting output of the microphone(s) into digital signals if the microphones are integrated with or hardwired directly to the device 110. If the microphone(s) are independent, the A/D converters will be included with the microphone(s), and may be clocked independent of the clocking of the device 110.

The input/output device interfaces 1610 may also include an interface for an external peripheral device connection such as universal serial bus (USB), FireWire, Thunderbolt or other connection protocol. The input/output device interfaces 1610 may also be configured to operate with to one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The network(s) 10 may include a local or private network or may include a wide network such as the internet. Through the network(s) 10, the system 100 may be distributed across a networked environment.

The device 110 further includes a time synchronization module 1624, which may comprise processor-executable instructions stored in storage 1608 to be executed by controller(s)/processor(s) 1604 (e.g., software, firmware, hardware, or some combination thereof). For example, components of the time synchronization module 1624 may be part of a software application running in the foreground and/or background on the device 110. The time synchronization module 1624 may control the device 110 as discussed above, for example with regard to FIGS. 1, 6, 7, 9A-9B, 10A-10B, 12, and/or 14A-14B. Some or all of the controllers/modules of the time synchronization module 1624 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Executable computer instructions for operating the device 110 and its various components may be executed by the controller(s)/processor(s) 1604, using the memory 1606 as temporary "working" storage at runtime. The computer instructions may be stored in a non-transitory manner in non-volatile memory 1606, storage 1608, or an external device. Alternatively, some or all of the executable instructions may be embedded in hardware or firmware in addition to or instead of software.

The components of the device 110, as illustrated in FIG. 16, are exemplary, and may be located a stand-alone device or may be included, in whole or in part, as a component of a larger device or system. Additionally or alternatively, multiple devices 110 may be employed in a single system 100, and the multiple devices 110 may include overlapping components. For example, in certain system configurations, a first device may transmit the audio data to a second device and/or a third device, and the second device and/or the third device may output the audio data at approximately the same time, such that the audio data is synchronized between the second device and the third device.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   determining a first data point having a first component corresponding to a first time and a second component equal to a first transit time, the first transit time corresponding to a length of time between a first device sending a first packet and a second device receiving the first packet;
   determining a second data point having a first component corresponding to a second time and a second component equal to a second transit time, the second transit time corresponding to a length of time between the second device sending a second packet and the first device receiving the second packet;
   determining that the first transit time is lower than a first time threshold;
   determining that the second transit time is lower than the first time threshold;
   determining a first vector between the first data point and the second data point, a first component of the first vector corresponding to a first time difference between the first time and the second time and a second component of the first vector corresponding to a second time difference between the first transit time and the second transit time;
   determining a midpoint of the first vector, a first component of the midpoint corresponding to a third time and a second component of the midpoint corresponding to an average of the first transit time and the second transit time, wherein a first time offset is equal to the second component of the midpoint; and
   determining, based on the first time offset, a first clock value associated with a first clock of the first device that corresponds to a second clock value associated with a second clock of the second device, the second clock value corresponding to a fourth time after the third time.

2. The computer-implemented method of claim 1, further comprising:
   determining first data points corresponding to packets sent from the first device to the second device, the first data points including the first data point;
   determining a first convex hull enclosing the first data points;
   determining that the first data point is along the first convex hull;
   determining second data points corresponding to packets sent from the second device to the first device, the second data points including the second data point;
   determining a second convex hull enclosing the second data points;
   determining that the second data point is along the second convex hull;
   receiving an instruction to output audio data at the second clock value associated with the second clock; and
   outputting, using the audio data, audio at the first clock value.

3. The computer-implemented method of claim 1, further comprising:
   determining a third data point having a first component corresponding to a fifth time and a second component equal to a third transit time, the third transit time corresponding to a length of time between the second device sending a third packet and the first device receiving the third packet;
   determining a second vector between the second data point and the third data point;
   determining a slope value of the second vector; and
   determining a second time offset based on the first time offset and the slope value.

4. The computer-implemented method of claim 1, further comprising:
   determining that a fixed duration of time has not elapsed since a wireless communication session between the first device and the second device was initiated;
   determining a third data point having a first component corresponding to a fifth time and a second component equal to a third transit time, the third transit time corresponding to a length of time between the second device sending a third packet and the first device receiving the third packet;
   determining a second vector between the second data point and the third data point;
   determining a slope value of the second vector;
   determining that an absolute value of the slope value exceeds a second threshold; and
   setting a frequency offset between the first clock and the second clock equal to a value of zero.

5. The computer-implemented method of claim 1, further comprising:
   determining that a fixed duration of time has not elapsed since a first wireless communication session between the first device and the second device was initiated;
   determining a frequency offset between the first clock and the second clock, the frequency offset corresponding to a second wireless communication session between the first device and the second device prior to the first wireless communication session; and
   determining a second time offset value based on the first time offset value and the frequency offset.

6. The computer-implemented method of claim 1, further comprising:
   determining a third data point having a first component corresponding to a fifth time and a second component equal to a third transit time, the third transit time corresponding to a length of time between the second device sending a third packet and the first device receiving the third packet;
   determining a second vector between the second data point and the third data point;
   determining a slope value of the second vector;
   determining that an absolute value of the slope value is greater than a second threshold; and
   discarding the first data point, the second data point and the third data point.

7. The computer-implemented method of claim 1, further comprising:
   detecting a change in one or more network parameters of a wireless communication session between the first device and the second device, the one or more network parameters corresponding to at least one of a network identification, a base station identification, a frequency band or a throughput associated with the wireless communication session;
   discarding the first data point and the second data point;
   determining a third data point having a first component corresponding to a fifth time and a second component equal to a third transit time, the third transit time corresponding to a length of time between the first device sending a third packet and the second device receiving the third packet;
   determining a fourth data point having a first component corresponding to a sixth time and a second component equal to a fourth transit time, the fourth transit time corresponding to a length of time between the second device sending a fourth packet and the first device receiving the fourth packet; and determining, based on the third data point and the fourth data point, a second time offset.

8. The computer-implemented method of claim 1, further comprising:

determining a third data point having a first component corresponding to a fifth time and a second component equal to a third transit time, the third transit time corresponding to a length of time between the second device sending a third packet and the first device receiving the third packet;

determining a second vector between the first data point and the third data point, a first component of the second vector corresponding to a third time difference between the first time and the fifth time and a second component of the second vector corresponding to a fourth time difference between the first transit time and the third transit time;

determining a second midpoint of the second vector, a first component of the second midpoint corresponding to a sixth time and a second component of the second midpoint corresponding to an average of the first transit time and the third transit time; and determining a second time offset by averaging the second component of the midpoint and the second component of the second midpoint.

9. A computer-implemented method, comprising:

determining a first data point having a first component corresponding to a first time and a second component equal to a first transit time, the first transit time corresponding to a length of time between a first device sending a first packet and a second device receiving the first packet;

determining a second data point having a first component corresponding to a second time and a second component equal to a second transit time, the second transit time corresponding to a length of time between the second device sending a second packet and the first device receiving the second packet;

determining that the first transit time that is lower than a first time threshold;

determining that the second transit time that is lower than the first time threshold;

determining a first time offset by averaging the first transit time and the second transit time; and determining, based on the first time offset, a first clock value associated with a first clock of the first device that corresponds to a second clock value associated with a second clock of the second device.

10. The computer-implemented method of claim 9, further comprising:

determining first data points corresponding to packets sent from the first device to the second device, the first data points including the first data point;

determining a first convex hull enclosing the first data points;

determining that the first data point is along the first convex hull;

determining second data points corresponding to packets sent from the second device to the first device, the second data points including the second data point;

determining a second convex hull enclosing the second data points;

determining that the second data point is along the second convex hull;

receiving an instruction to output audio data at the second clock value associated with the second clock; and outputting, using the audio data, audio at the first clock value.

11. The computer-implemented method of claim 9, further comprising:

determining first data points corresponding to packets sent from the first device to the second device, the first data points including the first data point;

determining a first convex hull enclosing the first data points;

determining that the first data point is along the first convex hull;

determining second data points corresponding to packets sent from the second device to the first device, the second data points including the second data point;

determining a second convex hull enclosing the second data points;

determining that the second data point is along the second convex hull;

determining a third data point along the second convex hull that is closest to the first data point;

determining a first vector between the first data point and the third data point;

determining a fourth data point along the first convex hull that is closest to the second data point;

determining a second vector between the second data point and the fourth data point;

determining that the first vector is shorter than the second vector;

determining a frequency offset between the first clock and the second clock based on a slope of the second convex hull associated with the third data point; and determining a second time offset based on the first time offset and the frequency offset.

12. The computer-implemented method of claim 9, further comprising:

determining a third data point having a first component corresponding to a third time and a second component equal to a third transit time, the third transit time corresponding to a length of time between the second device sending a third packet and the first device receiving the third packet;

determining a vector between the second data point and the third data point;

determining a slope value of the vector; and determining a second time offset based on the first time offset and the slope value.

13. The computer-implemented method of claim 9, further comprising:

determining that a fixed duration of time has not elapsed since a wireless communication session between the first device and the second device was initiated;

determining a third data point having a first component corresponding to a third time and a second component equal to a third transit time, the third transit time corresponding to a length of time between the second device sending a third packet and the first device receiving the third packet;

determining a vector between the second data point and the third data point;

determining a slope value of the vector;

determining that an absolute value of the slope value exceeds a second threshold; and setting a frequency offset between the first clock and the second clock equal to a value of zero.

14. The computer-implemented method of claim 9, further comprising:
- determining that a fixed duration of time has not elapsed since a first wireless communication session between the first device and the second device was initiated;
- determining a frequency offset between the first clock and the second clock, the frequency offset corresponding to a second wireless communication session between the first device and the second device prior to the first wireless communication session; and
- determining a second time offset value based on the first time offset value and the frequency offset.

15. The computer-implemented method of claim 9, further comprising:
- determining a third data point having a first component corresponding to a third time and a second component equal to a third transit time, the third transit time corresponding to a length of time between the second device sending a third packet and the first device receiving the third packet;
- determining a vector between the second data point and the third data point;
- determining a slope value of the vector;
- determining that an absolute value of the slope value is greater than a second threshold; and
- discarding the first data point, the second data point and the third data point.

16. The computer-implemented method of claim 9, further comprising:
- detecting a change in one or more network parameters of a wireless communication session between the first device and the second device, the one or more network parameters corresponding to at least one of a network identification, a base station identification, a frequency band or a throughput associated with the wireless communication session;
- discarding the first data point and the second data point;
- determining a third data point having a first component corresponding to a third time and a second component equal to a third transit time, the third transit time corresponding to a length of time between the first device sending a third packet and the second device receiving the third packet;
- determining a fourth data point having a first component corresponding to a fourth time and a second component equal to a fourth transit time, the fourth transit time corresponding to a length of time between the second device sending a fourth packet and the first device receiving the third packet; and
- determining, based on the third data point and the fourth data point, a second time offset.

17. The computer-implemented method of claim 9, wherein determining the first time offset further comprises:
- determining a first vector between the first data point and the second data point, a first component of the first vector corresponding to a first time difference between the first time and the second time and a second component of the first vector corresponding to a second time difference between the first transit time and the second transit time;
- determining a first midpoint of the first vector, a first component of the first midpoint corresponding to a third time and a second component of the first midpoint corresponding to an average of the first transit time and the second transit time; and
- determining that the second component of the first midpoint corresponds to the first time offset.

18. The computer-implemented method of claim 17, further comprising:
- determining a third data point having a first component corresponding to a fourth time and a second component equal to a third transit time, the third transit time corresponding to a length of time between the second device sending a third packet and the first device receiving the third packet;
- determining a second vector between the first data point and the third data point, a first component of the second vector corresponding to a third time difference between the first time and the fourth time and a second component of the second vector corresponding to a fourth time difference between the first transit time and the third transit time;
- determining a second midpoint of the second vector, a first component of the second midpoint corresponding to a fifth time and a second component of the second midpoint corresponding to an average of the first transit time and the third transit time; and
- determining a second time offset by averaging the second component of the first midpoint and the second component of the second midpoint.

19. The computer-implemented method of claim 9, further comprising:
- determining first data points corresponding to packets sent from the first device to the second device, the first data points including the first data point;
- determining a first convex hull enclosing the first data points;
- determining second data points corresponding to packets sent from the second device to the first device, the second data points including the second data point;
- determining a second convex hull enclosing the second data points; and
- determining, at a first time, a second time offset based on the first convex hull and the second convex hull.

20. The computer-implemented method of claim 19, further comprising:
- determining third data points corresponding to packets sent from the first device to the second device after the first time;
- determining a portion of the first data points that are within a time range;
- determining a third convex hull enclosing the portion of the first data points and the third data points;
- determining fourth data points corresponding to packets sent from the second device to the first device after the first time;
- determining a portion of the second data points that are within the time range;
- determining a fourth convex hull enclosing the portion of the second data points and the fourth data points; and
- determining a third time offset based on the third convex hull and the fourth convex hull.

* * * * *